US012775263B2

(12) United States Patent
Hazel et al.

(10) Patent No.: US 12,775,263 B2
(45) Date of Patent: Oct. 27, 2026

(54) DATA PROCESSING MANUFACTURING CONTROL SYSTEM FOR CNC MACHINERY

(71) Applicant: C. R. Onsrud, Inc., Troutman, NC (US)

(72) Inventors: Thomas Alexander Hazel, Davidson, NC (US); Jeffrey Thomas Onsrud, Mooresville, NC (US)

(73) Assignee: C. R. Onsrud, Inc., Troutman, NC (US)

( * ) Notice: Subject to any disclaimer, the term of this patent is extended or adjusted under 35 U.S.C. 154(b) by 253 days.

(21) Appl. No.: 18/790,608

(22) Filed: Jul. 31, 2024

(65) Prior Publication Data

US 2026/0036963 A1 Feb. 5, 2026

(51) Int. Cl.

*G05B 19/4093* (2006.01)
*G05B 19/402* (2006.01)
*G05B 19/409* (2006.01)
*G06F 3/0486* (2013.01)

(52) U.S. Cl.

CPC ..... *G05B 19/40932* (2013.01); *G05B 19/402* (2013.01); *G05B 19/409* (2013.01); *G06F 3/0486* (2013.01)

(58) Field of Classification Search

CPC ............ G05B 19/40932; G05B 19/402; G05B 19/409; G05B 19/4097; G06F 3/0486
See application file for complete search history.

(56) References Cited

U.S. PATENT DOCUMENTS

| | | | | |
|---|---|---|---|---|
| 5,933,353 A * | 8/1999 | Abriam | G05B 19/4097 | 700/182 |
| 2009/0248194 A1* | 10/2009 | Lammering | G05B 19/4163 | 700/173 |
| 2017/0255183 A1* | 9/2017 | Clement | B25J 9/1697 | |
| 2020/0125068 A1* | 4/2020 | Trounson, III | G05B 19/40938 | |
| 2023/0029940 A1* | 2/2023 | Shapiro | G06T 7/13 | |
| 2026/0145268 A1* | 5/2026 | Shapiro | B23K 26/032 | |

OTHER PUBLICATIONS

Arthaya, Bagus, Ari Setiawan, and Santoso Sunardi. "The design and development of G-code checker and cutting simulator for CNC turning operation." Journal of Mechanical Engineering Research 2.3 (2010): 58-70. (Year: 2010).*

Daskalogrigorakis, Grigoris, et al. "G-code machina: A serious game for g-code and cnc machine operation training." 2021 IEEE Global Engineering Education Conference (EDUCON). IEEE, 2021. (Year: 2021).*

* cited by examiner

*Primary Examiner* — Michael D Masinick

(74) *Attorney, Agent, or Firm* — Shumaker, Loop & Kendrick, LLP; Patrick B. Horne

(57) ABSTRACT

Systems and methods utilize a CNC machine and include processor(s) that initiate display of a cutting program for cutting, via a cutting tool of the CNC machine, a block of material, where the cutting program sets a bounded region for cutting into the block of material. A selection of a first part from catalogued part(s) is received, and based thereon (i) G-code data of the first part into a current cutting cycle of the cutting program is imported, and (ii) a cutting tool path used to cut into the bounded region defined by the cutting program is displayed, where the cutting tool path outlining a shape of the first part such that cutting, via the CNC machine, along the cutting tool path forms the first part from the block of material. A positioning input is received that indicates a location for the cutting tool path relative the bounded region.

20 Claims, 17 Drawing Sheets

600

DATA PROCESSING MANUFACTURING CONTROL SYSTEM FOR CNC MACHINERY

FIELD OF THE INVENTION

This invention relates generally to the field of manufacturing machines, and more particularly embodiments of the invention relate to data processing manufacturing control systems for CNC machinery.

BACKGROUND

Computer numerical control (CNC) machines are used in many manufacturing sectors to precisely and efficiently transform raw materials into finished goods. CNC machines utilize a pre-programmed computer to automatically perform various functions. Specifically, the CNC machine can be used to aid in the cutting of steel, wood, aluminum, composites, plastic, foam, and/or other raw materials. Although CNC machines are very useful in producing various products and performing various functions, there are a number of shortcomings that exist with existing data processing systems used to operate the CNC machines.

SUMMARY

Shortcomings of the prior art are overcome and additional advantages are provided through the provision of a data processing manufacturing control system. The system includes a CNC machine facilitating manufacture of one or more products, a cutting tool operatively coupled to a spindle of the CNC machine, at least one processor, a communication interface communicatively coupled to the at least one processor and the spindle, and a memory device storing executable code. When the executable code is executed, it causes the at least one processor to, at least in part, initiate display of a cutting program for cutting, via the CNC machine, a block of material, the cutting program setting a bounded region for cutting, via the cutting tool, into the block of material. Further, a selection of a first part from one or more catalogued parts is received, via a user interface. Based thereon, G-code data of the first part is imported into a current cutting cycle of the cutting program, and a cutting tool path used to cut into the bounded region defined by the cutting program is displayed, the cutting tool path outlining a shape of the first part such that cutting, via the cutting tool, along the first cutting tool path forms the first part from the block of material. A positioning input is received, via the user interface, the positioning input indicating a location for the first cutting tool path relative the bounded region.

Additionally, disclosed herein is a computer-implemented method that includes, at least in part, initiating display, via a user interface, of a cutting program for cutting, via a cutting tool of a CNC machine, a block of material, the cutting program setting a bounded region for cutting into the block of material. The method also includes receiving, via a user interface, a selection of a first part from one or more catalogued parts, and based thereon (i) importing G-code data of the first part into a current cutting cycle of the cutting program, and (ii) displaying a cutting tool path used to cut into the bounded region defined by the cutting program, the cutting tool path outlining a shape of the first part such that cutting, via the CNC machine, along the cutting tool path forms the first part from the block of material. Further, the method includes receiving, via the user interface, a positioning input, the positioning input indicating a location for the cutting tool path relative the bounded region.

Also disclosed herein is a computing system. The computing system includes, at least in part, at least one processor, and a communication interface communicatively coupled to the at least one processor, and a memory device storing executable code that, when executed, causes the at least one processor to, at least in part, initiate display, via a user interface, of a cutting program for cutting, via a cutting tool of a CNC machine, a block of material, the cutting program setting a bounded region for cutting into the block of material. The system also receives, via a user interface, a selection of a first part from one or more catalogued parts, and based thereon (i) imports G-code data of the first part into a current cutting cycle of the cutting program, and (ii) displays a cutting tool path used to cut into the bounded region defined by the cutting program, the cutting tool path outlining a shape of the first part such that cutting, via the CNC machine, along the cutting tool path forms the first part from the block of material. In addition, a positioning input is received, via the user interface, that indicates a location for the cutting tool path relative the bounded region.

The features, functions, and advantages that have been described herein may be achieved independently in various embodiments of the present invention including computer-implemented methods, computer program products, and computing systems or may be combined in yet other embodiments, further details of which can be seen with reference to the following description and drawings.

BRIEF DESCRIPTION

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1:
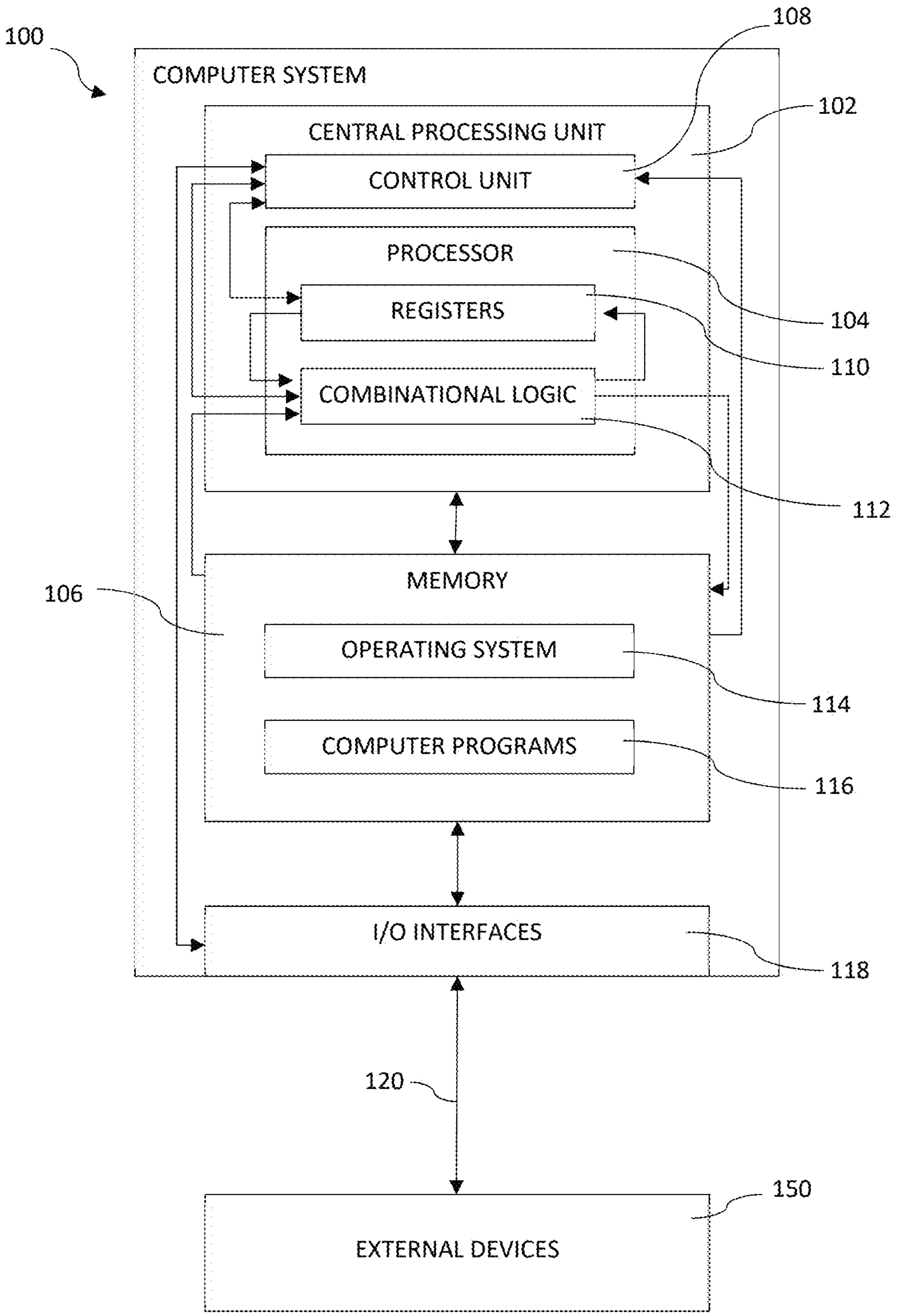
FIG. 1 depicts an example computer system configured to perform various processes described herein, according to an embodiment of the present invention.

Aspects of the present invention and certain features, advantages, and details thereof are explained more fully below with reference to the non-limiting examples illustrated in the accompanying drawings. It is to be understood that the disclosed embodiments are merely illustrative of the present invention and the invention may take various forms. Further, the figures are not necessarily drawn to scale, as some features may be exaggerated to show details of particular components. Thus, specific structural and functional details illustrated herein are not to be interpreted as limiting, but merely as a representative basis for teaching one skilled in the art to employ the present invention.

Descriptions of well-known processing techniques, systems, components, etc. are omitted to avoid obscuring the invention with well-known details. It should be understood that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

The specification may include references to "one embodiment," "an embodiment," "various embodiments," "one or more embodiments," etc. may indicate that the embodiment(s) described may include a particular feature, structure or characteristic, but every embodiment may not necessarily include the particular feature, structure, or characteristic. In some cases, such phrases are not necessarily referencing the same embodiment. When a particular feature, structure, or characteristic is described in connection with an embodiment, such description can be combined with features, structures, or characteristics described in connection with other embodiments, regardless of whether such combinations are explicitly described. Thus, unless described or implied as exclusive alternatives, features throughout the drawings and descriptions should be taken as cumulative, such that features expressly associated with some particular embodiments can be combined with other embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The terms "couple," "coupled," "couples," "coupling," "fixed," "attached to", and the like should be broadly understood to refer to connecting two or more elements or signals electrically and/or mechanically, either directly or indirectly through intervening circuitry and/or elements. Two or more electrical elements may be electrically coupled, either direct or indirectly, but not be mechanically coupled; two or more mechanical elements may be mechanically coupled, either direct or indirectly, but not be electrically coupled; two or more electrical elements may be mechanically coupled, directly or indirectly, but not be electrically coupled. Coupling (whether only mechanical, only electrical, or both) may be for any length of time, e.g., permanent or semi-permanent or only for an instant. "Communicatively coupled to" and "operatively coupled to" can refer to physically and/or electrically related components.

In addition, as used herein, the terms "about," "approximately," or "substantially" for any numerical values or ranges indicate a suitable dimensional tolerance that allows the device, part, or collection of components to function for its intended purpose as described herein.

Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention. While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code can include both software and hardware. For example, program code in certain embodiments of the present invention can include fixed function hardware, while other embodiments can utilize a software-based implementation of the functionality described. Certain embodiments combine both types of program code.

As used herein, the term "provider" generally describes a person or business enterprise that hosts, maintains, otherwise provides, and/or uses computer systems that provide functionality for the disclosed systems and methods. In particular, the term "provider" may generally describe a person or business enterprise providing goods or services accessible via one or more user devices. Interactions between a provider system and a user device may utilize a communicative interaction between a computing system of the provider, and a user device of a user. For instance, user(s) may provide various inputs to a user device that can be interpreted and analyzed using processing systems of the user device and/or processing systems of the provider system. Further, the provider system and the user device may be in communication via a network. According to various embodiments, the provider system and/or user device(s) may also be in communication with external or third party devices (e.g., a third-party server) of a third-party system that may be used to perform one or more computing operations. In some embodiments, the functions of one illustrated system or server may be provided by multiple systems, servers, or computing devices, including those physically located at a central computer processing facility and/or those physically located at remote locations.

Embodiments of the present invention are described herein, with reference to flowchart illustrations and/or block diagrams of computer-implemented methods and computing systems according to embodiments of the invention. Each block of the flowchart illustrations and/or block diagrams, and combinations of blocks in the flowchart illustrations and/or block diagrams, can be implemented by computer readable program instructions that may be provided to a processor of a general purpose computer, special purpose computer, or other programmable data processing apparatus or apparatuses (the term "apparatus" includes systems and computer program products). In particular, the computer readable program instructions, which be executed via the processor of the computer or other programmable data processing apparatus, create a means for implementing the functions/acts specified in the flowchart and/or block diagram block or blocks.

In one embodiment, these computer readable program instructions may also be stored in one or more computer-readable storage media that can direct a computer or other programmable data processing apparatus, and/or other devices, to function in a particular manger, such that a computer readable storage medium of the one or more computer-readable storage media having instructions stored therein comprises an article of manufacture including instructions which implement aspects of the actions specified in the flowchart illustrations and/or block diagrams. In particular, the computer-readable program instructions may be used to produce a computer-implemented method by executing the instructions to implement the actions specified in the flowchart illustrations and/or block diagram block or blocks. Example computer readable storage media may include, but not be limited to, any electronic storage device, a magnetic storage device, an optical storage device, an electromagnetic storage device, a semiconductor storage device, or any suitable combination of the foregoing. A non-exhaustive list of example computer readable storage media include a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a microdrive, a mechanically encoded device such as punch-cards or raised structures in a groove having instructions recorded thereon, and any suitable combination of the foregoing. Computer readable storage media, as used herein, may be used for long-term, intermediate-term, and/or short-term storage of computer-readable instructions, but is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

In another embodiment, these computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

Example computer program instructions may include assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language (e.g., Java, Ruby, Python, C#, hypertext preprocessor (PHP), C++, or the like, and procedural programming languages, such as FORTRAN, BASIC, the "C" programming language, or similar programming languages.

The computer program instructions, whether stored in the computer-readable storage medium and/or computer-readable memory may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

In the flowchart illustrations and/or block diagrams disclosed herein, each block in the flowchart/diagrams may represent a module, segment, a specific instruction/function or portion of instructions/functions, and incorporates one or more executable instructions for implementing the specified logical function(s). Additionally, the alternative implementations and processes may also incorporate various blocks of the flowcharts and block diagrams. For instance, in some implementations the functions noted in the blocks may occur out of the order noted in the figures. For example, two blocks shown in succession may be executed substantially concurrently, or the functions of the blocks may sometimes be executed in the reverse order, depending upon the functionality involved.

FIG. 1 depicts an example computer system 100 configured to perform various processes described herein, according to an embodiment of the present invention. The example computer system 100 may be incorporated into a user device that includes, for example, a laptop, a computer, a tablet, a mobile computing device such as a smart phone, a portable digital assistant, a pager, a television, a gaming device, an audio/video player, a virtual assistant device, an internet-of-things device, a smart home device, a wireless personal response device, any combination of the aforementioned, and/or any other electronic device with processing and communication capabilities. As used herein, a user can be an individual, a group, or an entity having access to the computer system 100. For instance, the term user may be one of many users, a market or community of users, customers, consumers, business entities, government entities, and groups of any size. The computer system 100 is in communication with one or more external device(s) 150, which may include, for example, devices (e.g., server(s)) of a provider system. The computer system 100 includes one or more central processing unit(s) 102 (CPU) that includes one or more processor(s) 104. The CPU(s) 102 and/or additional processor(s) 104 include functional components used in the execution of instructions and/or otherwise may be configured to perform a computer-implemented method by executing instructions. For example, the CPU(s) 102 and/or additional processor(s) 104 may include functional components to fetch program instructions from one or more locations such as the memory 106, which may include a cache or main memory. The CPU(s) 102 and/or additional processor(s) 104 may decode the program instructions and execute the program instructions, which may or may not require accessing the memory 106 as part of the instruction execution. Further, the CPU(s) 102 and/or additional processor(s) 104 may write results of the executed instructions to, for example, a destination register for storing the result of the execution, or various other locations for further processing and/or storage. The CPU 102 may include a control unit 108 that directs the operation of the processor(s) 104 and may include, for example, a binary decoder to convert coded instructions into timing and control signals that direct the operation of various other components (e.g., memory 106) of the computer system 100.

Processor(s) 104 may include circuitry for implementing communication and/or logic functions of the computer system 100. The processor(s) 104 may include a digital signal processor, a microprocessor, a graphics processing unit (GPU), a microcontroller, an application-specific integrated circuit (ASIC), a programmable logic device (PLD), digital signal processor (DSP), a field programmable gate array (FPGA), programmable logic arrays (PLA) a state machine, a controller, gated or transistor logic, discrete physical hardware components, various analog to digital converters, digital to analog converters, and/or other support circuits and/or combinations thereof. According to various embodiments, the processor(s) 104 may also include register(s) 110 that configured as a small amount of fast storage and may be used and/or otherwise accessed by one or more of the functional components for various operations (e.g., arithmetic operations, bitwise operations, etc.). The processor(s) 104 may also utilize a combinational logic system 112 to perform various calculations (e.g., using Boolean algebra) on input signals and stored data to produce specified outputs from such inputs. Control and signal processing functions of the computer system 100 are allocated between these processor(s) 104 according to their respective capabilities based on the functionality used to encode and interleave messages and data prior to modulation and transmission thereof. Processor(s) 104 may include an internal data modem and other functionality to operate software programs (e.g., computer programs 116). In one non-limiting example, the processor(s) 104 may be capable of operating a connectivity program, such as a web browser application, that may then allow the computer system 100 to transmit and receive (e.g., to one or more external device(s) 150) content such as, for example, web content, location-based content, etc. in accordance with a Wireless Application Protocol (WAP), Hypertext Transfer Protocol (HTTP), and/or the like.

The memory 106 may be operatively coupled to the processor(s) 104 and can be or include main or system memory (e.g. RAM), non-volatile memory, volatile memory, or any computer readable storage media used to store data, code or other information that the processor(s) 104 use in the execution of program instructions. Memory 106 can include storage device(s) such as hard drive(s), flash media, optical media, and/or cache memory that may be embedded and/or removable, as examples. Memory 106 can include, for instance, a cache, such as a shared cache, which may be coupled to local caches (examples include L1 cache, L2 cache, etc.) of processor(s) 104. In various embodiments, the memory 106 includes any tangible device that can retain and store instructions for use ban an instruction execution device (e.g., processor(s) 104). The memory 106 can store any number of pieces of information and data used by the computer system 100 to implement functions described herein as well as other functions not expressly described.

Additionally, memory 106 may be or include at least one computer program product having a set (e.g., at least one) of program modules, instructions, code or the like that is/are configured to carry out functions of embodiments described herein when executed by the processor(s) 104. Memory 106 can store an operating system 114, other computer programs 116, such as one or more computer programs/applications that execute to perform aspects described herein, and/or various other data items. Specifically, programs/applications can include computer readable program instructions and code that may be configured to carry out functions of embodiments of aspects described herein, and can also include cashed data, user files, audio files, video recordings, files downloaded or received from other devices, and/or other data items required or related to any or all of the programs/applications. Example programs/applications can include integrated software applications that manage device resources, generate user interfaces, accept user inputs, and facilitate communications with other devices among other functions. The integrated software applications can include an operating system, such as Linux®, UNIX®, Windows®, macOS®, iOS®, Android®, or other operating system compatible with personal computing devices. Programs/applications can also include applications (e.g., a mobile application) considered web-browser applications that typically provide a graphical user interface (GUI) that can be displayed (e.g., via a user interface) and may include features for accepting inputs from users (e.g., via control puts such as text boxes, data fields, hyperlinks, pull down menus, check boxes, and the like). Example GUI display screens may include features for displaying information and accepting inputs from users, and may include control inputs such as text boxes, data fields, hyperlinks, pull-down menus, check boxes, radio buttons, and the like. One of ordinary skill in the art will appreciate that the exemplary functions and user-interface display screens are not intended to be limiting, and an integrated software application may include other display screens and functions.

Computer system 100 may also include input/output (I/O) interfaces 118 through which external device(s) 150 are connected. Example external device(s) 150 in some examples may include an external sever, workstation, set of servers, cloud-based application or system, etc. located outside of the user computer system 100 that the computer system 100 may access via the Internet. In some examples, external device(s) 150 may additionally or alternatively include electrical components included within the user device itself. Specifically, an I/O device may be incorporated into the computer system 100 itself or the I/O device may be regarded as an external device 150 coupled to the computer system 100 through one or more I/O interfaces 118.

External device(s) 150 can include, but are not limited to, printers, display monitors, microphone(s), speaker(s), Global Positioning System (GPS) devices, camera(s) (e.g., digital cameras), lights, non-transitory storage media (e.g., ROM), accelerometers, gyroscopes, magnetometers, sensor devices configured to sense light, proximity, heart rate, body and/or ambient temperature, blood pressure, and/or skin resistance, activity monitors, a keyboard, a pointing device, a joystick, a button, soft key, infrared sensor, a display screen (e.g., a liquid crystal display (LCD), light emitting diode (LED) display, or the like), a sensitive input screen (e.g., a touch screen or the like), a proximity sensor or transmitter configured to detect proximate images (e.g., a quick response QR code) or objects (e.g., a radio-frequency identification tag) using electromagnetic fields, and/or any other devices that enable a user to interact with computer system 100, any device that enables computer system 100 to communicate with one or more other computing systems or peripheral devices, one or more data storage devices, which may store one or more programs, one or more computer readable program instructions, and/or data, etc., removable/non-removable storage media, volatile/non-volatile computer system storage media, a magnetic disk drive for reading from and writing to a removable, non-volatile magnetic disk (e.g., a "floppy disk"), an optical disk drive for reading from or writing to a removable, non-volatile optical disk, such as a CD-ROM, DVD-ROM or other optical media, non-volatile magnetic media (typically called a "hard drive"), and/or any other suitable devices adapted to provide an input or output to the computer system 100 and/or commonly used with any suitable operating system on personal computers, central computing systems, phones, and/or similar devices.

I/O interfaces 118 may provide communication (e.g., two-way communication and data exchanges). Example I/O interfaces 118 may additionally or alternatively include, for example, a network interface/adapter that enables the computer system 100 to communicate with one or more networks, such as a local area network (LAN), a general wide area network (WAN), and/or a public network (e.g., the Internet), and/or provide communication with other computing devices or systems, storage devices, or the like. Specific examples of I/O interfaces 118 may also include Ethernet-based (such as Wi-Fi) interfaces, near-field communication devices, transceivers, and/or Bluetooth® adapters. (BLUETOOTH is a registered trademark of Bluetooth SIG, Inc., Kirkland, Washington, U.S.A.). The I/O interfaces 118 may be configured, in some embodiments, as a means for providing user inputs via virtual buttons, selectable options, a virtual keyboard, a touch screen, a touchpad, and other indicia that, when touched, can be used by the user to control the computer system 100. The I/O interfaces 118 may include and/or be operatively connected to circuitry used to convert analog signals and/or other signals into digital data, and/or may be configured to convert digital data to another type of signal. For example, the I/O interfaces 118 may receive and convert physical contact inputs, physical movements, auditory signals, etc. to digital data. Once converted, the digital data may be provided to the processor(s) 104 for processing.

The I/O interfaces 118 may be coupled to processor(s) 104, external device(s), and each other via one or more buses, circuitry, intraconnections, and/or other connections that facilitate communication. Bus connections represent one or more of any of several types of bus structures, including a memory bus or memory controller, a peripheral bus, an accelerated graphics port, a high-speed interface, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI). The bus connections may operatively couple and/or electrically connect various components of the computer system 100 with one another directly or indirectly by way of intermediate components.

The communication between I/O interfaces 118 and external devices 150 can occur across wired and/or wireless communications link(s) 120, such as Ethernet-based wired, universal serial bus (USB) wired or wireless connections. Example wireless connections include cellular, Wi-Fi, Bluetooth®, proximity-based, near field, or other types of wireless connections. More generally, communications link(s) 120 may be any appropriate wireless and/or wired communication link(s) 120 for communicating data. In some instances, the communications link(s) may utilize various modes and/or protocols, including, as non-limiting examples, global system for mobile (GSM) voice communication, short message service (SMS), enterprise messaging service (EMS), multimedia messaging service (MMS) messaging, second-generation (2G) wireless communication protocols IS-95 such as code division multiple access (CDMA), IS-136 such as time division multiple access (TDMA), personal digital cellular (PDC), or general packet radio service (GPRS), third-generation (3G) wireless communication protocols, such as Universal Mobile Telecommunications System (UMTS), CDMA2000, wideband CDMA (WCDMA) and/or time division-synchronous CDMA (TD-SCDMA), fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like.

Specific example I/O interfaces 118 that may be used to perform the processes disclosed herein may incorporate and or otherwise be configured to capture an image (e.g., via camera(s) and/or other optical instrument(s)). The I/O interfaces 118 may include one or more lenses and one or more image sensors (e.g., a charge coupled device (CCD) sensor) configured to convert photons into an electrical signal. For example, pixels of each the image sensors may each include a photodiode (e.g., a semiconductor) that becomes electrically charged in accordance with the strength of the light that strikes the photodiode, where the electrical charge is then relayed to be converted to an electrical signal. In one embodiment, a series of pulses may be applied to the one or more image sensors to relay the accumulate charges within each photodiode in succession down a row of photodiodes to an edge of the respective image sensor. Other optical instrument functionalities are also contemplated herein.

In various embodiments, the I/O interfaces 118 may be configured to obtain and/or process various forms of authentication by obtaining authentication information from a user of a user device accessing or that otherwise incorporates the computer system 100. The authentication information may be provided, for example, to access specific information that is restricted to authorized users. In one example, a restricted web portal may require login credentials from the user in order to provide the user with access to the web portal and perform various functionalities therethrough. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems. For instance, in some cases, in order to authenticate a user, the user may be required to provide multi-factor authentication by requiring more than one authentication method.

In various embodiments, the I/O interfaces 118 may include a positioning device and/or otherwise be configured to identify a geographic location of a user device using a positioning system. For example, the I/O interfaces 118 may include a GPS transceiver, an antenna, transmitter, and/or receiver that can be used, via triangulation of cellular signals, to identify an approximate location of a user device.

The I/O interfaces 118 can include sensors of various types and functionalities. The sensors may be or include a single-axis, 2-axis, or 3-axis motion sensor and may respond to the magnitude, direction, or both, of the sensor motion. The motion sensor may be a piezoelectric, a piezoresistive, a capacitive, or a MEMS accelerometer. In some embodiments, the sensors may be or include a force sensor and may respond to the magnitude, direction, or both, of a force, and may be based on a spring extension, a strain gauge deformation, a piezoelectric effect, or a vibrating wire. The force sensor may be a dynamometer that responds to a torque or to a moment of the force. The sensors may be or include an absolute, a relative displacement, or an incremental position sensor, and may respond to a linear or angular position, or motion, of a sensed element. In some embodiments, the sensor(s) output an analog signal, and the device further comprising an Analog to Digital (A/D) converter coupled between the sensor(s) and the processor(s) 104 for converting the analog signal to a digital data.

In some embodiments, particular portions or steps of methods and functions described herein are performed in whole or in part by way of the CPU 102, processor(s) 104, and/or cloud-based computing devices/systems such that the computer system 100 facilitates operations that may only partially be performed locally and may incorporate communication, data transfer, and/or user inputs and outputs.

According to various embodiments, the user of the computer system 100 can be any individual, a group, entity, etc. that is in possession of or has access to a user device which may be personal or public devices used to access the computer system 100. The user can provide inputs to the computer system 100 through, for example, user-side actions including voice, text, movement, and/or graphical indicia selections Computer system 100 may be operational with numerous other general purpose or special purpose computing system environments or configurations. Computer system 100 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like. The computer system 100 may also be referred to herein as a data processing device/system, computing device/system/node, or simply a computer. The computer system 100 may be based on one or more of various system architectures and/or instruction set architectures.

In some embodiments, the computing system environments may be configured such that the computer system 100 can generate content data manually or obtain content data from a third-party source, such as a cloud storage service or remote database. In some embodiments, the content that can be accessed can include audio data or alphanumeric text data representing written communication. The third-party system can be integrated with the computer system 100 through an application programmable interface (API) software application that facilitates communication between software systems by mapping computer-readable commands and data formats between systems. In some embodiments, the computer system 100 accesses the third-party system using an Internet browser software application to access a web-based software interface.

Figure 2:
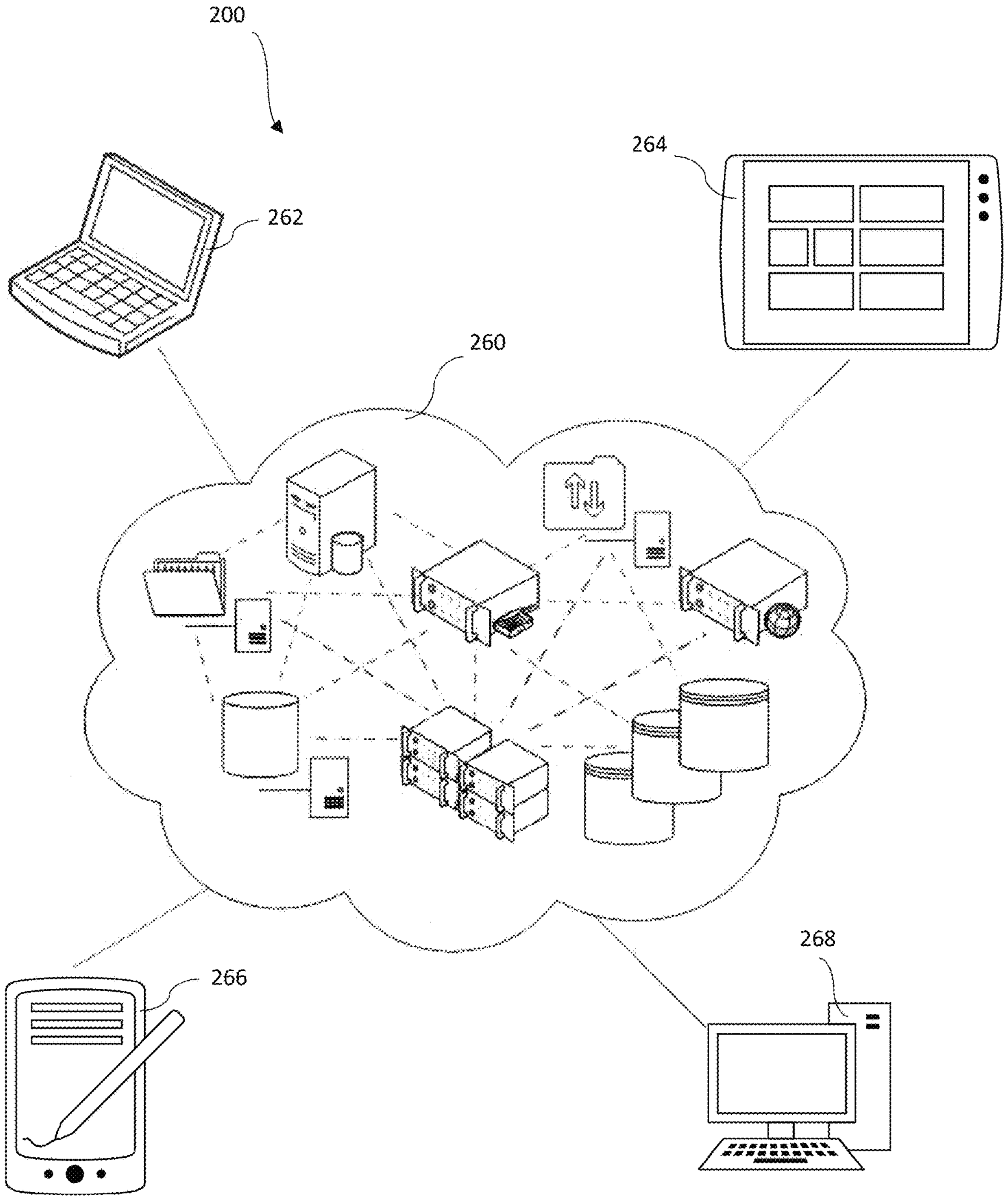
FIG. 2 depicts an example cloud computing environment, according to an embodiment of the present invention.

FIG. 2 depicts an example cloud-computing environment 200, according to an embodiment of the present invention. The cloud-computing environment 200 may be provided by a "provider" and include a network 260 that is communicatively connected, via wireless and/or wired connections to various network devices that may be local and/or remote to one another. Example network devices may include the user devices, such as laptop 262, tablet 264, smart phone 266, and desktop 268, as well as various other computing devices, mobile devices, and/or servers. As depicted, the network 260 can be a large distributed network that includes multiple servers (e.g., file servers, catalog servers, computing servers, application servers, etc.), databases, storage locations, and/or computers. The network 260 may facilitate sharing data and/or resources across distributed locations. Although singly depicted with one network 260 for illustrative convenience, the cloud-computing environment 200 may include more than one network without departing from the scope of this description. In some embodiments, the network 260 may be or include a secured network. In some embodiments, the network 260 may be implemented, at least in part, through one or more connections to the Internet. In some embodiments, a portion of the network 260 may include a virtual private network (VPN) or an Intranet.

The cloud-computing environment 200 may also include wired and wireless links, including, as non-limiting examples, 802.11a/b/g/n/ac, 802.20, WiMAX, LTE, and/or any other wireless link. The network 260 may include any internal or external network, networks, sub-network, and combinations of such operable to implement communications between various computing components within and beyond the illustrated cloud-computing environment 200. The network 260 may communicate, for example, Internet Protocol (IP) packets, frames using frame relay, voice, video, data, and other suitable information between network addresses. The network 260 may also include one or more local area networks (LANs), radio access networks (RANs), metropolitan area networks (MANs), wide area networks (WANs), personal area networks (PANs), WLANs, campus area network (CAN), storage-area network (SAN), all or a portion of the internet and/or any other communication system or systems at one or more locations.

The network 260 may incorporate various cloud-based deployment models including, for example, private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public that remain unique entities but are bound together by standardized or proprietary technology that enables data and application portability (e.g., load-balancing between cloud networks).

At least some of the network devices, such as the user devices (e.g., laptop 262, tablet 264, smart phone 266, and desktop 268) may include a computer system, such as the computer system 100 of FIG. 1. The network 260 may also include any number of data sources, user devices, consumers, customers, third-party devices, external databases, servers, etc. from any number of users (e.g., individual persons, institutions, companies, organizational entities, groups, etc.). In some embodiments, the network 260 incorporates any number of virtual resources, such as cloud resources or virtual machines. Virtual resources may utilize a cloud-computing configuration to provide an infrastructure that includes a network of interconnected nodes and provides stateless, low coupling, modularity and semantic interoperability. Such interconnected nodes may incorporate a computer system that includes one or more processors, a memory, and a bus that couples various system components (e.g., the memory) to the processor, and may be grouped physically or virtually in one or more networks. It should be understood that such interconnected nodes may include the types of computing devices and systems depicted, as an example, in FIG. 1, which is intended to be illustrative only, and such interconnected nodes can communicate with any type of computerized device across the network 260. Such virtual resources may be available for shared use among multiple distinct resource consumers and in certain implementations, virtual resources do not necessarily correspond to one or more specific pieces of hardware, but rather to a collection of pieces of hardware operatively coupled within a cloud-computing configuration so that the resources may be shared as needed.

Cloud computing utilized by the cloud-computing environment 200 is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Processes described herein may be performed singly or collectively by one or more computer systems (e.g., such as computer system 100) that are accessible via the network 260. It is to be understood that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

The network 260 of the cloud-computing environment 200 may be configured to be accessed by a network device (e.g., laptop 262, tablet 264, smart phone 266, and desktop 268) to provision computing capabilities, such as server time and network storage, as needed without requiring human interaction with the provider. Further, the network 260 may be accessed through standard computer systems (e.g., via I/O interfaces 118 of computer system 100) used by thin or thick client platforms (e.g., mobile phones, laptops, PDAs, etc.). Further, the network 260 may pool computing resources to serve multiple network devices using, for example, a multi-tenant model with various physical and virtual resources assigned in accordance with demand. For instance, physical and/or virtual resources accessed via the network 260 may be dynamically assigned and reassigned to different end-users such that the end-user has no control or knowledge of the exact location of the provider resources accessed via the network 260, although general abstraction may be used to identify a datacenter location, city, state, country, etc. The network 260 may also be scaled and provisioned, sometimes automatically, rapidly and elastically based on various functionality requirements and/or usages. In some instances, the network resources available via the network 260 may be regulated based on a metering capability (e.g., based on storage, processing, bandwidth, active user accounts, etc.).

Figure 3:
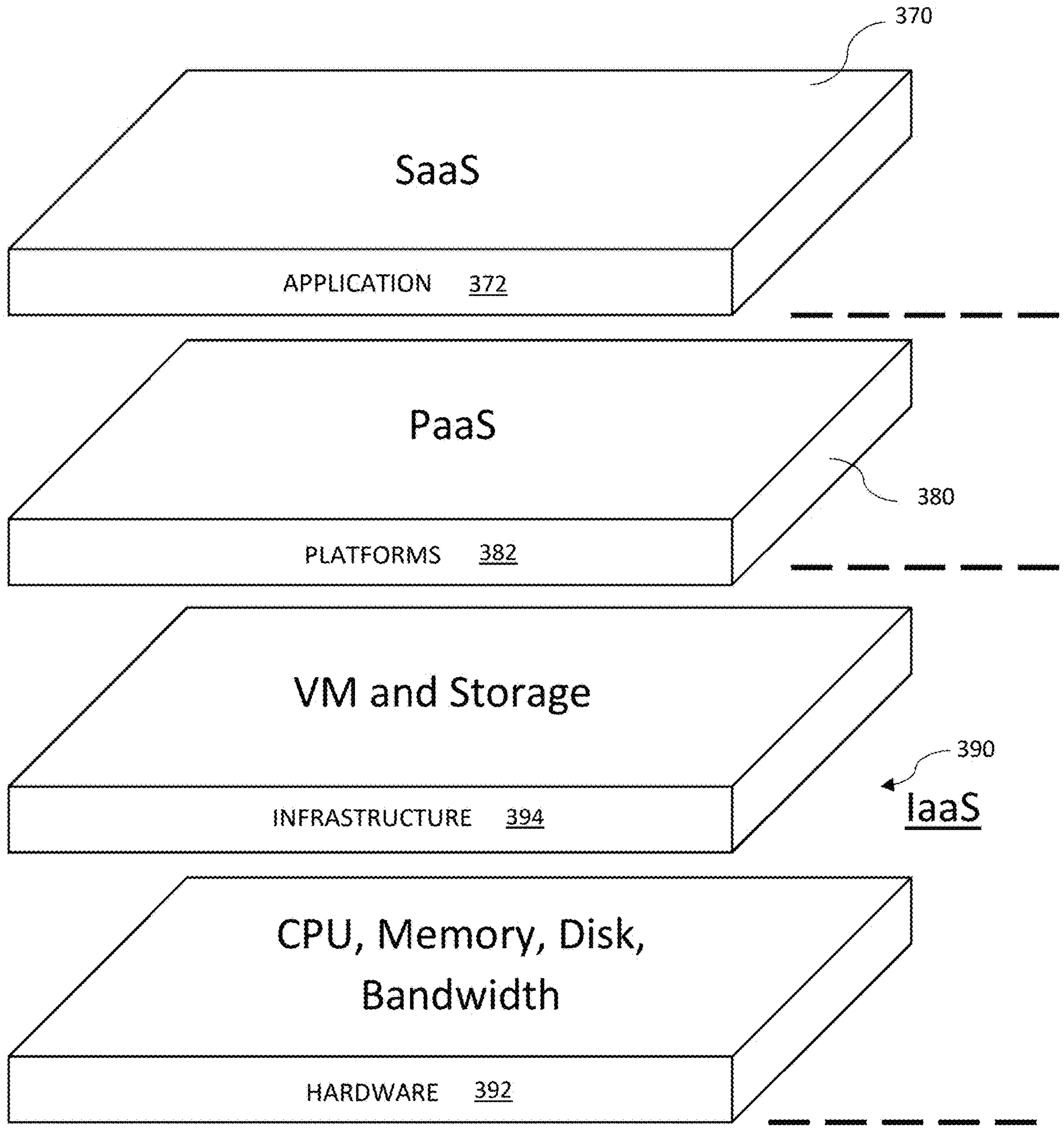
FIG. 3 depicts an example of cloud computing layers, according to an embodiment of the present invention.

FIG. 3 depicts an example of cloud computing services, according to an embodiment of the present invention. The cloud computing services may be utilized by a cloud computing environment (e.g., cloud-computing environment 200) and may include a Software-as-a-Service (SaaS) 370, a Platform as a Service (PaaS) 380, and/or an Infrastructure as a Service (IaaS) 390. The cloud computing services offer infrastructure, platforms, and/or applications/software as services to and end-user so that the end-user does not need to maintain resources on a local computing device.

The SaaS service 370 may provider an end-user with the ability to use the provider's applications that are accessible and operable via cloud infrastructure. Specifically, the provider's applications layer 372 may be accessible via various network devices that include computer systems (e.g., computer system 100) via, for example, a thin client interface such as a web browser. With the SaaS model, the end-user is not authorized to manage or control the underlying cloud infrastructure, network, servers, operating systems, storage, or individual application capabilities offered by the provider, with the exception of limited user-specific application configuration settings.

The PaaS service 380 may provide the end-user with the ability to deploy consumer-created or acquired applications onto the cloud infrastructure using a platform layer 382, where the consumer-created applications may be created using programming languages and tools supported by the provider. Specifically, the end-user is not authorized to manage or control the underlying cloud infrastructure including networks, servers, operating systems, or storage. However, the end-user is authorized to control the deployed applications and possibly application hosting environment configurations available via the platform layer 382.

The IaaS 390 service may provide the end-user with the ability to provision processing, storage, networks, and other fundamental computing resources. The IaaS service includes a hardware layer 392 that is responsible for managing the physical resources available via the cloud-computing environment (e.g., cloud-computing environment 200). Specifically, the hardware layer 392 may include physical servers, routers, switches, power and cooling systems and may, according to one embodiment, be implemented using one or more data centers that incorporate many (e.g., hundreds, thousands, etc.) of interconnected servers, CPUs, mainframes, reduced instruction set computer (RISC), architecture based servers, blade servers, storage devices, network computing components, memory, disk, bandwidth, etc. organized through switches, routers, and/or other fabrics.

IaaS service 390 may also include an infrastructure layer (e.g., a virtualization layer) 394 that includes virtual machine capabilities and storage capabilities using computing resources that may be partitioned using various virtualization technologies (e.g., a hypervisor that runs directly on the system hardware (e.g., Xen), a kernel-based virtual machine (KVM), Hyper-V virtualization, VMware software, etc.). With IaaS service 390, the end-user may be able to deploy and run arbitrary software, which can include operating systems and applications, via the virtual machines. Although the end-user would not be authorized to manage or control the underlying cloud infrastructure, the end-user would be authorized to control operating systems, storage, deployed applications, and some limited network components (e.g., host firewalls).

Although various embodiments are described above, these are only examples. For example, computing environments of other architectures can be used to incorporate and use one or more embodiments. Many variations are possible.

Disclosed herein is a software suite and corresponding user interface for a CNC machine system. Non-limiting example cutting machines that the cutting program of the computer system would be able to control include a computer numerical control (CNC) machine that is capable of functioning in different axes of motion (e.g., a 3-axis CNC machine, a 5-axis CNC machine, etc.). G-code (also RS-274) is the common name for the most widely adopted numerical control programming language utilized by CNC machines; however, various embodiments of the invention modify existing G-code to implement specific production processes. The software's use of certain G-code data disclosed herein is an improvement to any existing computer-aided manufacturing (CAM) software (e.g., Mastercam) because it provides added functional control of CNC automated machine tools in order to more easily back-plot the software to customize what is defined as a "part" (i.e., a component, a piece, a widget, an element, a unit, a module, an item, a section, a portion, etc.) in order to save each "part" individually for simplified customization of a cutting cycle. Generally speaking, the G-code instructions are provided to a machine controller that instructs the motors, components, pieces, etc. of the machine where to move, how fast to move, and what path to follow. In one common application, the G-code defines the machining path for a cutting tool such that the tool is moved according to the instructions through a toolpath, thereby cutting away material from an object (such as a piece of metal or wood) to leave only the finished product. The disclosed software can output multi-axis code with various compensation calls (i.e., length, diameter offsets, etc.) in order to minimize wasted material and maximize use of the object's material.

Example outputs that may be displayed via a GUI may depict the G-code for a current cutting cycle. The user interface may also depict different functionalities of the cutting program to allow a person to control what "part" would be cut from a block of material, the portion of the block of material from which the "part" would be cut, the positioning of the toolpath to cut the "part", etc.

The cutting program may be in communication with the CNC machine and a processor may read the G-Code of the cutting program and transmit signals to components, elements, motors, etc. of the CNC machine in order to cause the CNC machine to operate accurately and effectively. The cutting program is configured to back-plot the G-code such that it provides a digital representation of the toolpath that would be used to cut the "part" from the block of material that is visually depicted via the user interface. All features related to the "part" that would need to be incorporated into a toolpath would be depicted including interior holes, slots, pockets, curves, edges, abscesses, grooves, etc. A user can save each toolpath for each respective "part" as individual part programs with the correct header information in the G-Code that includes a cutting origin, cutting offset, running modes, tool information (e.g., tool size) etc. These saved toolpaths for the "parts" can then be selectively and manually identified and then nested within an overall cutting process so that any number of different "parts" can be cut from the same block of material as part of a single cutting process. The disclosed system provides an advantage over existing CAD or CAM software systems in which performs part arrangement and identification before the G-code is generated as such systems would be more cumbersome as the entire code would need to be re-generated for each custom cutting process. In contrast, the cutting program disclosed herein saves the G-code for each toolpath for a corresponding part such that when a part is selected the entire G-code for that part is inserted into the G-code for a current cutting process such that the G-code for the entire cutting process is being built as each part is selected. Once all of the parts are selected, the G-code for the toolpaths for each part is already complete since it was being produced in real-time during the part selection process. The current cutting process can then be saved independently as a bundle of toolpaths for each part so that the same cutting process can be repeatedly performed if desired.

In some embodiments, once a specific cutting tool has been selected, the stored toolpaths for the "parts" that use other or different cutting tools may be removed or filtered from the selectable options in order to maximize efficiencies so that the cutting tool does not need to be exchanged with a different cutting tool during a single cutting process. Advantageously, this ensures that the cutting program operates smoothly and effectively.

In some embodiments, during a cutting process the user interface may display a live representation of the cutting path of the cutting tool while the cutting tool is following the toolpath and machining out the "part" so that the user can readily identify what "part(s)" have been cut from the block of material and what "part(s)" still need to be cut from the block of material as part of the current cutting process. Further, the cutting program can extrapolate how long it will take to follow the toolpath to cut out each part based on the distance the cutting tool will need to travel for the toolpath of each remaining part, the cutting tool being used, the type of material that is being cut, etc. in order to calculate how much time remains in a current cutting process.

Figure 4:
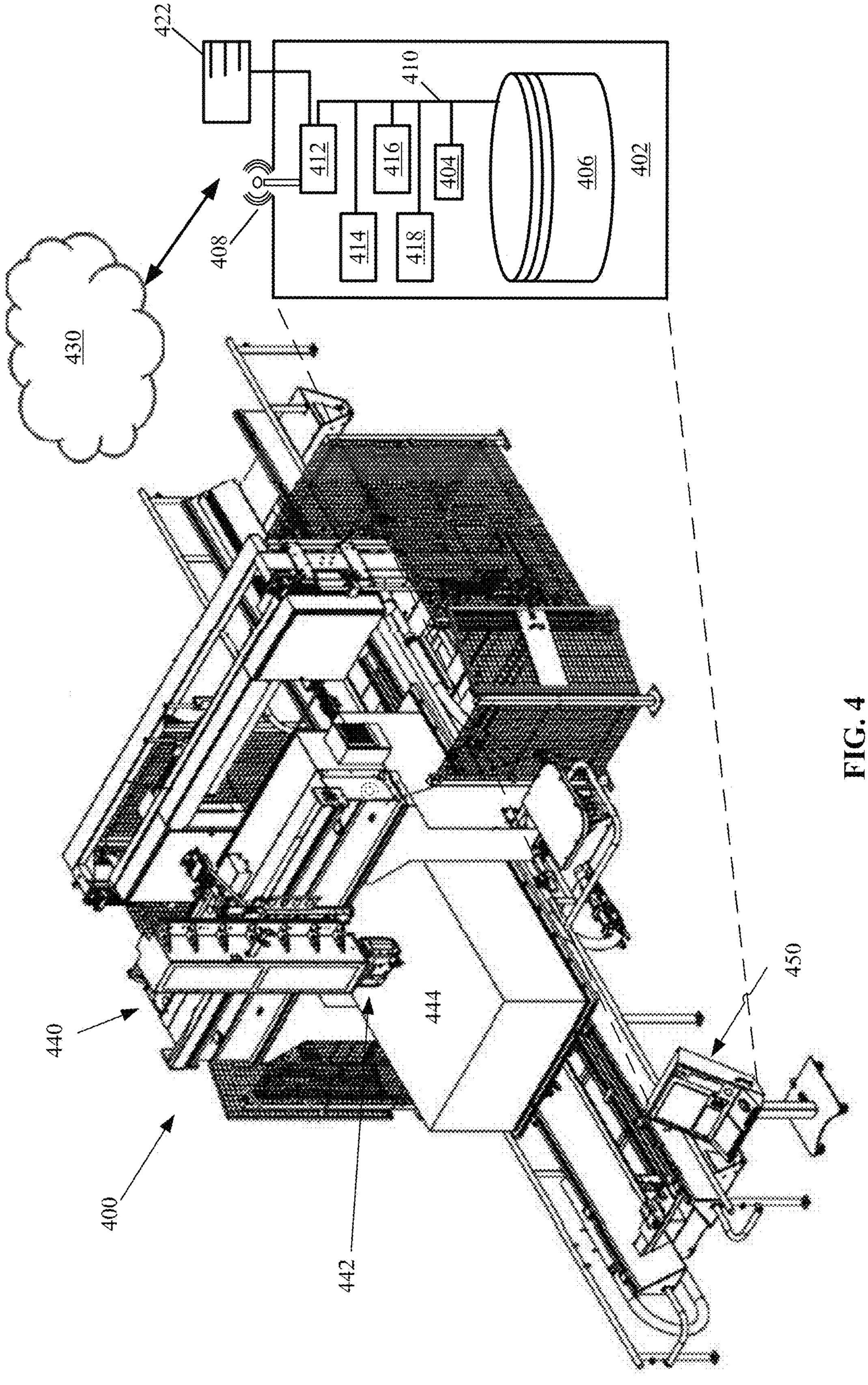
FIG. 4 depicts an example CNC machine environment, according to an embodiment of the present invention.

FIG. 4 depicts an example data processing manufacturing control system 400, in accordance with an embodiment of the present invention. The system 400 may include a cutting machine 440 that is communicatively connected to a computing system 402. The computing system 402 may be accessed via a computing device 450. The computing device 450 may be movable or stationary and may be positioned proximate the cutting machine 440. The cutting machine 440 may include an arm, a spindle, or other component 442 that facilitates cutting into a block of material 444. The computing system 402 may include at least one processor 404 and a memory device 406 that sores executable code. The processor 404 may include RAM, ROM, or any other non-transitory storage medium. The executable code can include instructions for an operating system and/or various other programs. The memory device 406 can store data inputs that are monitored and may be operatively coupled to the processor 404 via an intraconnect 410 (e.g., a system bus, a high-speed interface, and/or other electrical connection). The computing system may also include a communication interface 412 operatively coupled to a communication device 408. The communication interface 412 can include digital signal processing circuitry and may provide two-way communications and data exchanges, for example wirelessly via wireless communication device 408. Communications may be conducted via various modes or protocols, such as GSM voice calls, SMS, EMS, MMS messaging, TDMA, CDMA, PDC, WCDMA, CDMA2000, and GPRS. The communication device 408 can include, for example, a radio-frequency transceiver, a Bluetooth device, Wi-Fi device, a near-field communication device, and/or transceivers. The computing system 402 may include an input/output system 414. The input/output system 414 may include input/output circuitry that may operatively convert analog signals and other signals into digital data, or may convert digital data to another type of signal. For example, the input/output system 414 may receive and convert physical contact inputs, physical movements, or auditory signals to digital data. The input/output system 414 may be operatively coupled to a display 416 (e.g., a liquid crystal display (LCD), light emitting diode (LED) display, or the like). The display 416 may graphically display various user interfaces of a cutting program for cutting, via the cutting machine 440, into the block of material 444.

Figure 5A:
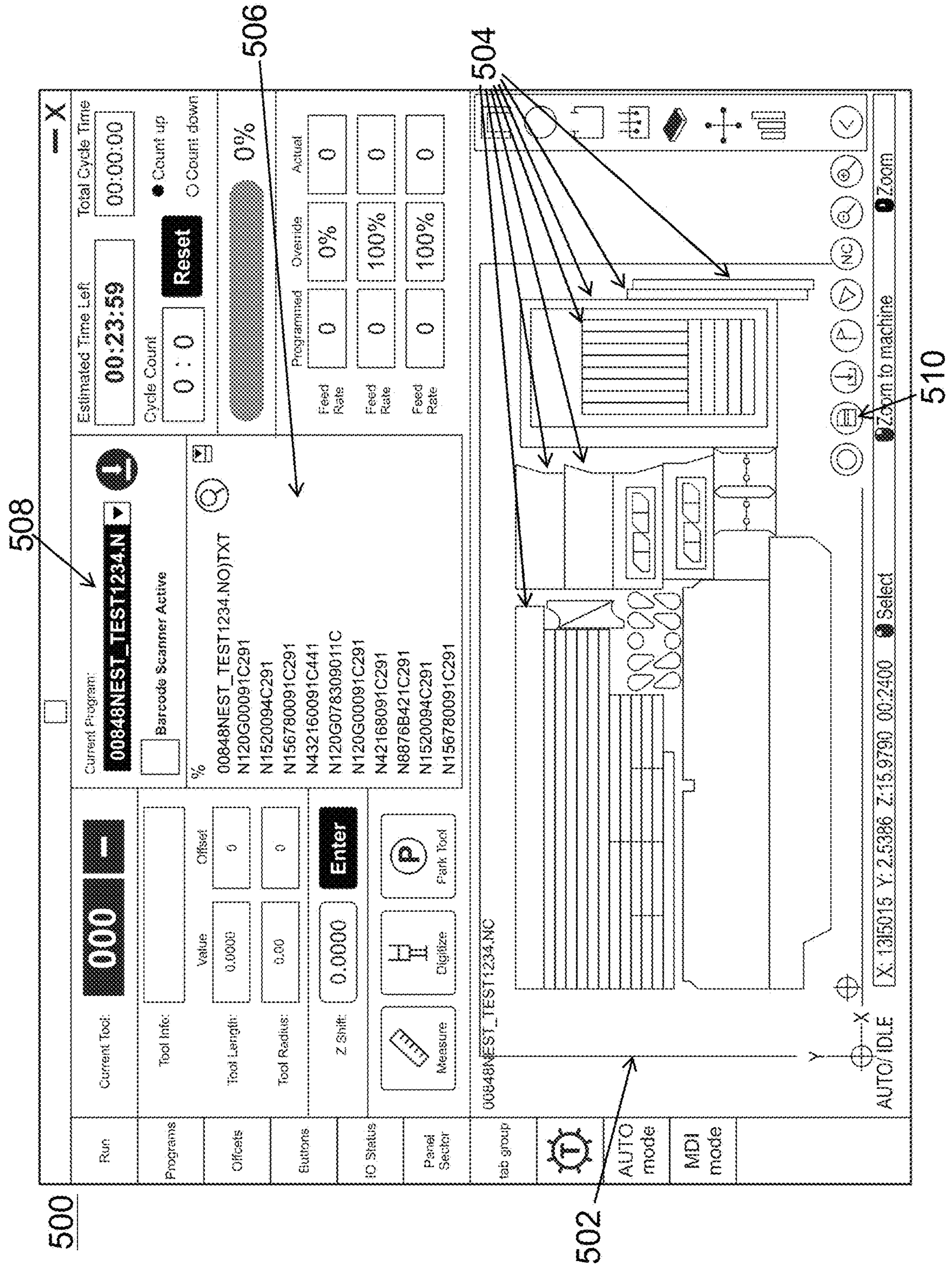
FIG. 5A depicts an example user interface for programming cuts into a block of material using a CNC machine, according to an embodiment of the present invention.
Figure 5B:
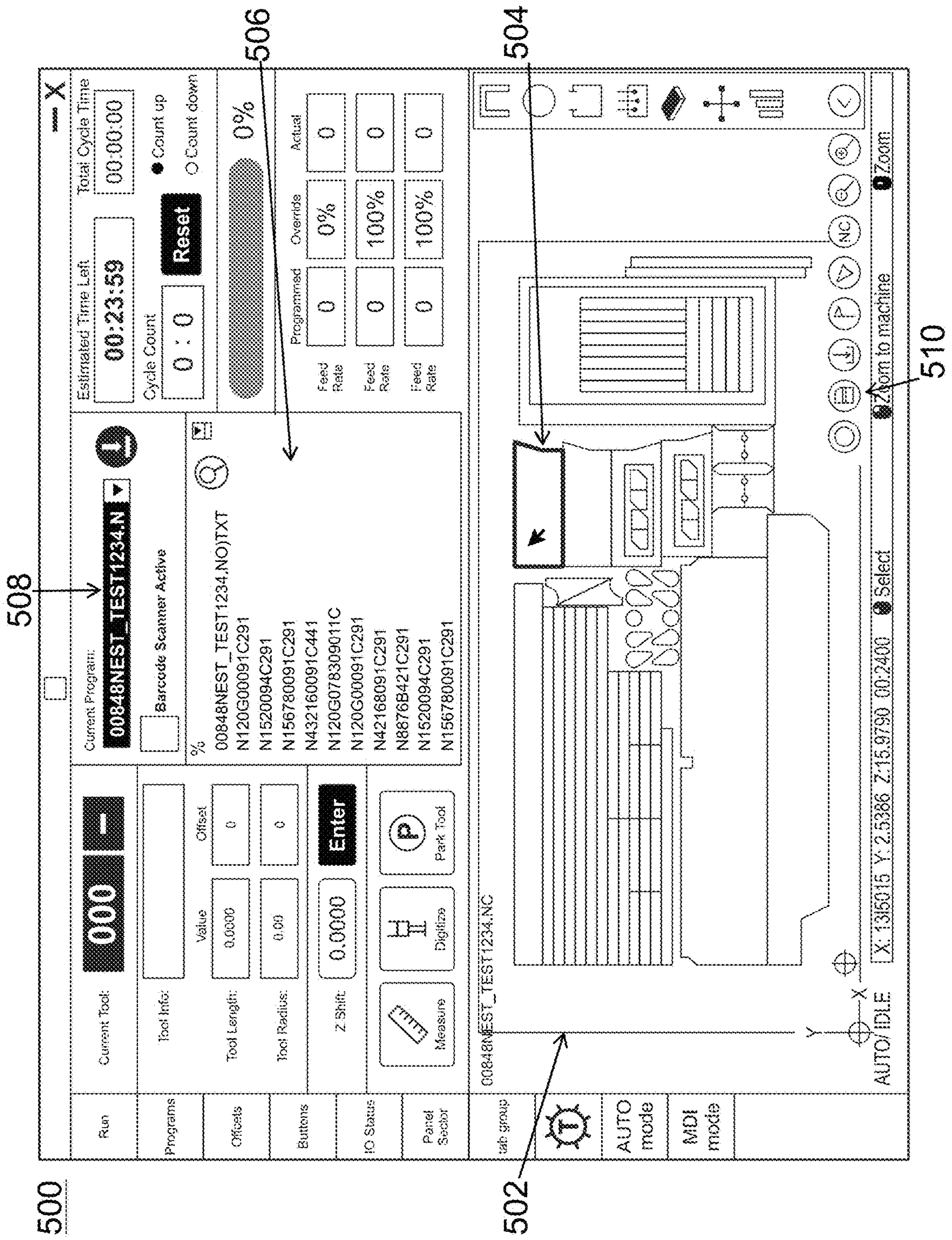
FIG. 5B depicts an example user interface for selecting a part so that G-code data for a part can be saved, according to an embodiment of the present invention.
Figure 5C:
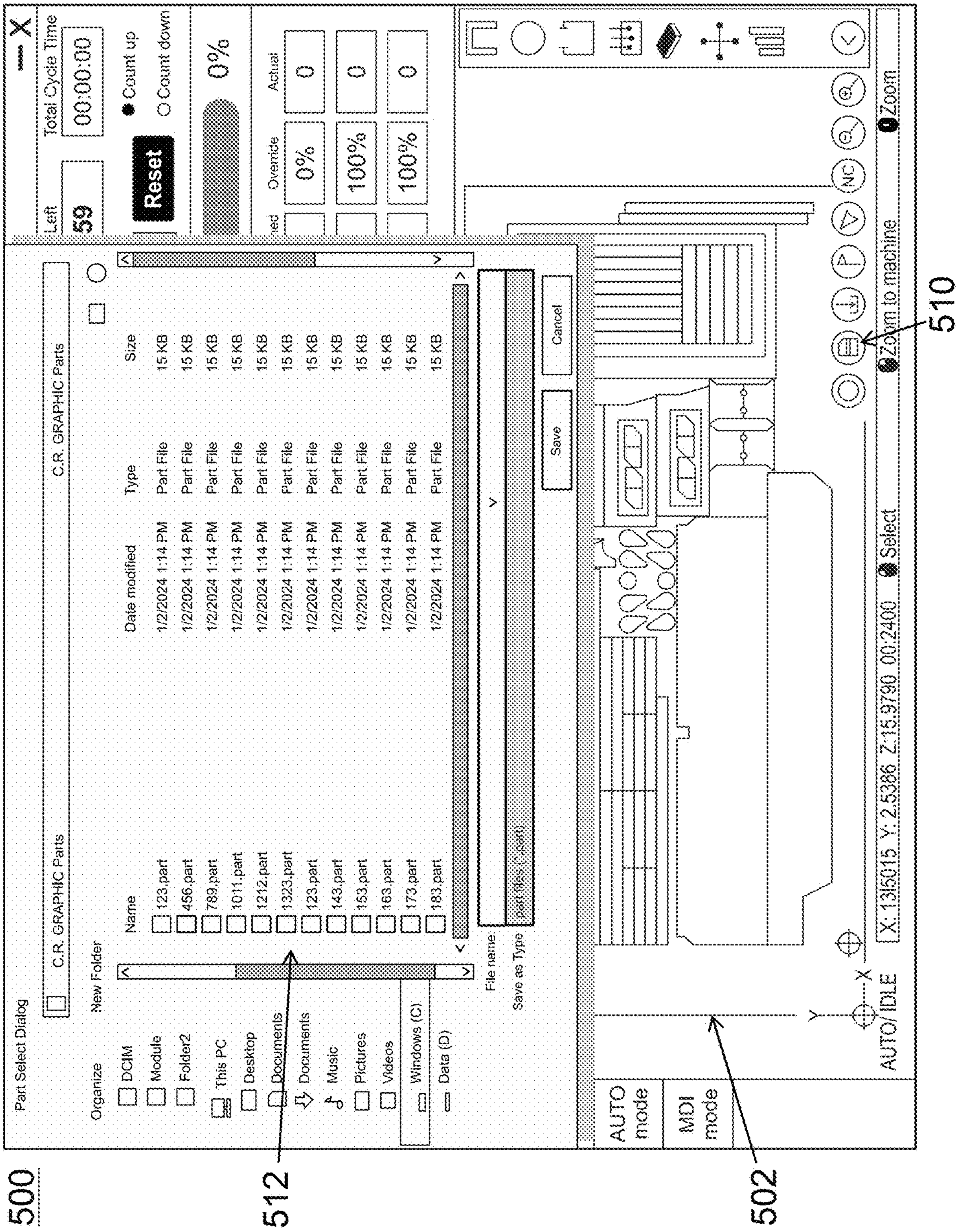
FIG. 5C depicts an example user interface for saving the G-code data of the part of FIG. 5B, according to an embodiment of the present invention.

FIGS. 5A-5C depict an example user interface 500 for programming cuts into a block of material using a CNC machine, according to an embodiment of the present invention. The user interface 500 depicts a bounded region 502 in the center bottom portion of the user interface 500 that represents a block of material that would be inserted into the CNC machine. Within the bounded region 502, many "parts" 504 are depicted. In reality, the lines that represent the "parts" 504 are the toolpaths to cut each part, so the parts themselves are slightly smaller as the cutting tool that follows the toolpath would shave away some of the material during the cutting process. Although when viewing the entirety of the bounded region 502 for the whole block the "parts" 504 appear to be touching, in actuality if the view were to be magnified there would be gaps between each toolpath for each "part" 504. The user interface 500 depicts an extrapolated estimation of the remaining time it would take to cut out each and every "part" 504 from the block of material. Radio buttons may also be displayed that allow a user to select whether the time being displayed is a count-down until complete or a count up indicating the amount of time that has passed during a current cutting process/cycle. The total time to complete the total cutting process (i.e., a cutting process cycle) from start to finish may also be depicted. A percentage bar depicting the percentage of the total cutting process that has been completed may also be displayed. The user interface has various control inputs (e.g., text boxes, drop down menus, radio buttons, selectable buttons, etc.) that are used to select and/or define various parameters for a cutting process (i.e., a cutting cycle). When a user selects a "part" 504 depicted within the bounded region, the G-code 506 for that "part" 504 is included within and depicted by the user interface 500. The G-code 506 lists the entire G-code for a current program 508, but when a user selects a given "part" 504, the portion of the G-code that is displayed is the corresponding G-code for that selected "part" 504.

The current program 508 is selectable from a drop down menu that accesses the G-code for various programs. For instance, the current program 508 would have one or more parts that have been saved as part of a standard cutting cycle/process so that the user does not have to completely customize and arrange the individual parts each time the user desires to start a cutting cycle/process. In some iterations, the G-code for the entire current program is downloadable.

The user interface 500 also indicates what current tool is to be applied to a current program 508 as indicated by the header information. However, the user may override the pre-saved tool and input tool information with length and radius if desired. Further, a standard offset to be positioned between each part may be preselected and stored in the G-code or the user may manually override the standard offset in order to minimize the space between each "part" 504 (i.e., to maximize material used) or to increase the space between each "part" 504 if needed based on the tool radius in order to avoid cutting into adjoining parts 504. The user interface 500 also allows the user to set a feed rate and/or override a pre-programmed feed rate, which indicate the speed at which the material is cut.

As shown by FIG. 5B, the cutting program may be used to select a part 504 (i.e., a component, a piece, a widget, an element, a unit, a module, an item, a section, a portion, etc.) to be cut from the block of material (see the block of material 444 of FIG. 4) so that G-code data for the selected part can then be saved, as shown by FIG. 5C, to the computer memory (see memory device 406 of FIG. 4). A user would move their cursor over a "part" 504 and select that "part" 504. The user may then select a "save" icon 510 to save the G-code of that "part" 504 as a single segment of the G-code so that the user can then create a custom cutting program and insert the G-code for that specific part 504 into G-code of the new custom cutting program.

Once the user has selected the "save" icon 510, a dialog box 512 may appear that allows the user to select a file name to assign to the "part" 504 and save the file. Once saved to one or more storage locations (e.g., computer memory) the saved file can be selected in future custom cutting programs and the G-code for that "part" 504 can be directly incorporated into G-code for the whole cutting program.

Figure 6A:
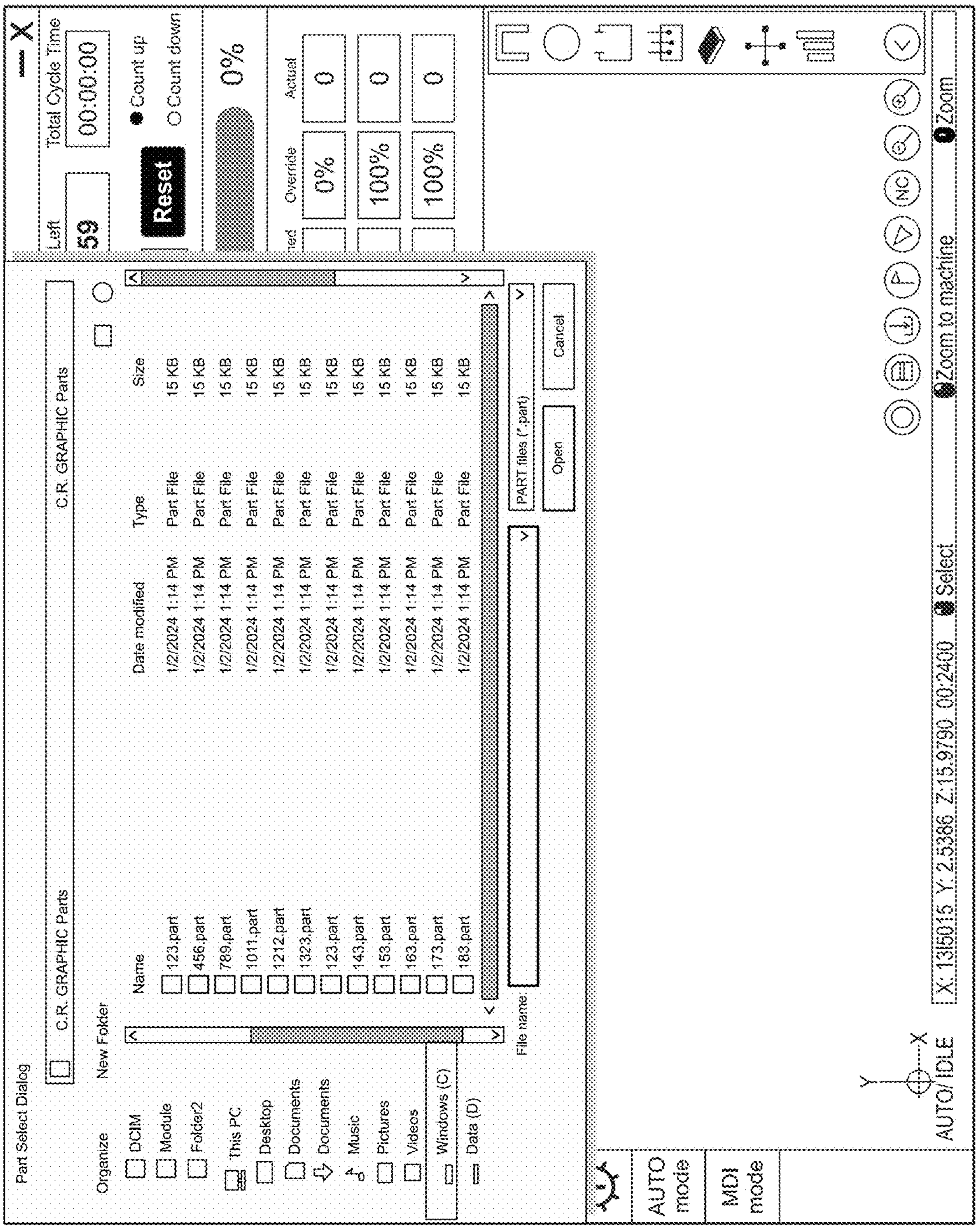
FIG. 6A depicts an example user interface for selecting a part that would be cut from a new block of material, according to an embodiment of the present invention.
Figure 6B:
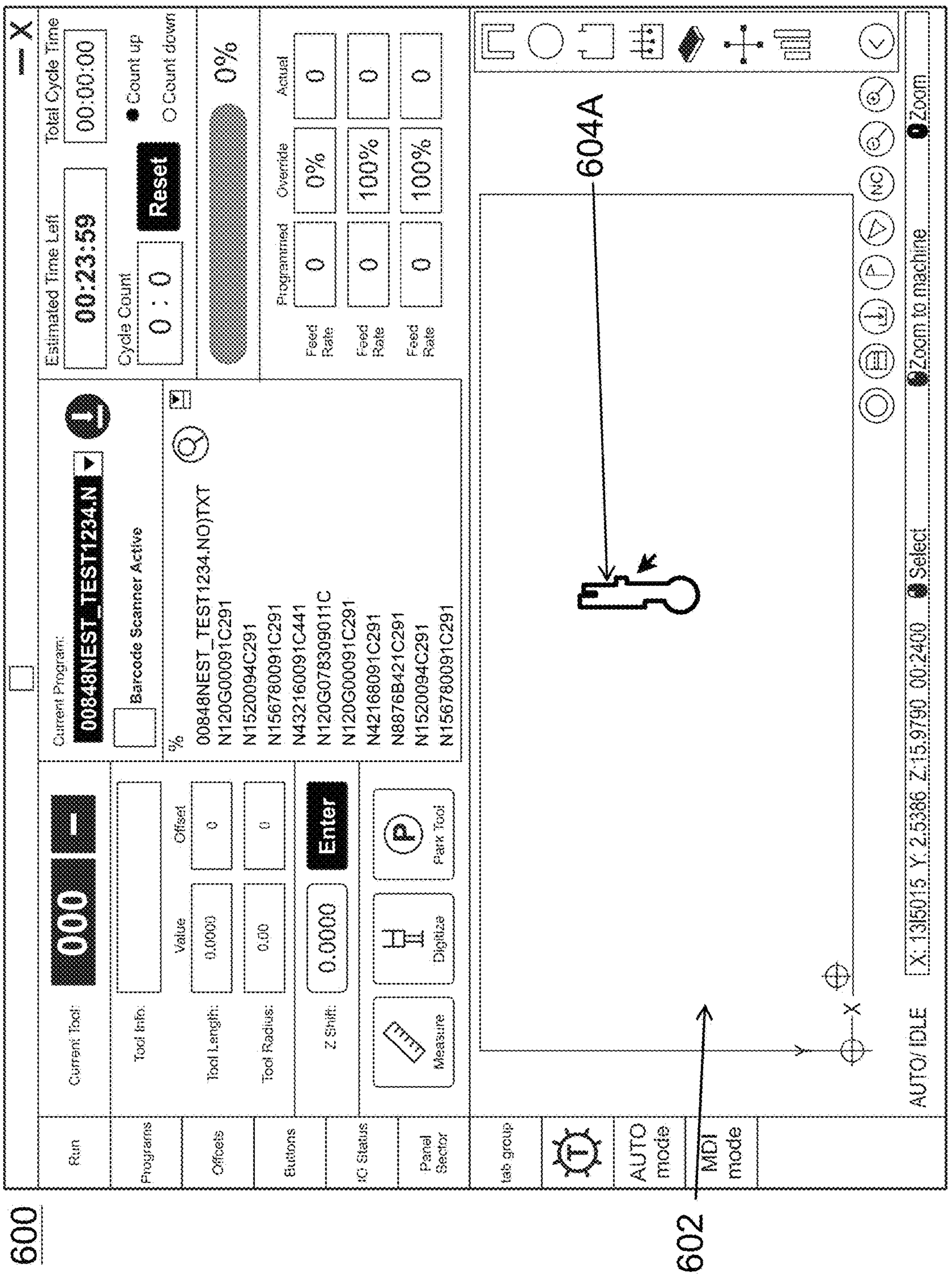
FIG. 6B depicts an example user interface for dragging the part selected in FIG. 6A into a bounded region so that the part can be cut from the new block of material, according to an embodiment of the present invention.
Figure 6C:
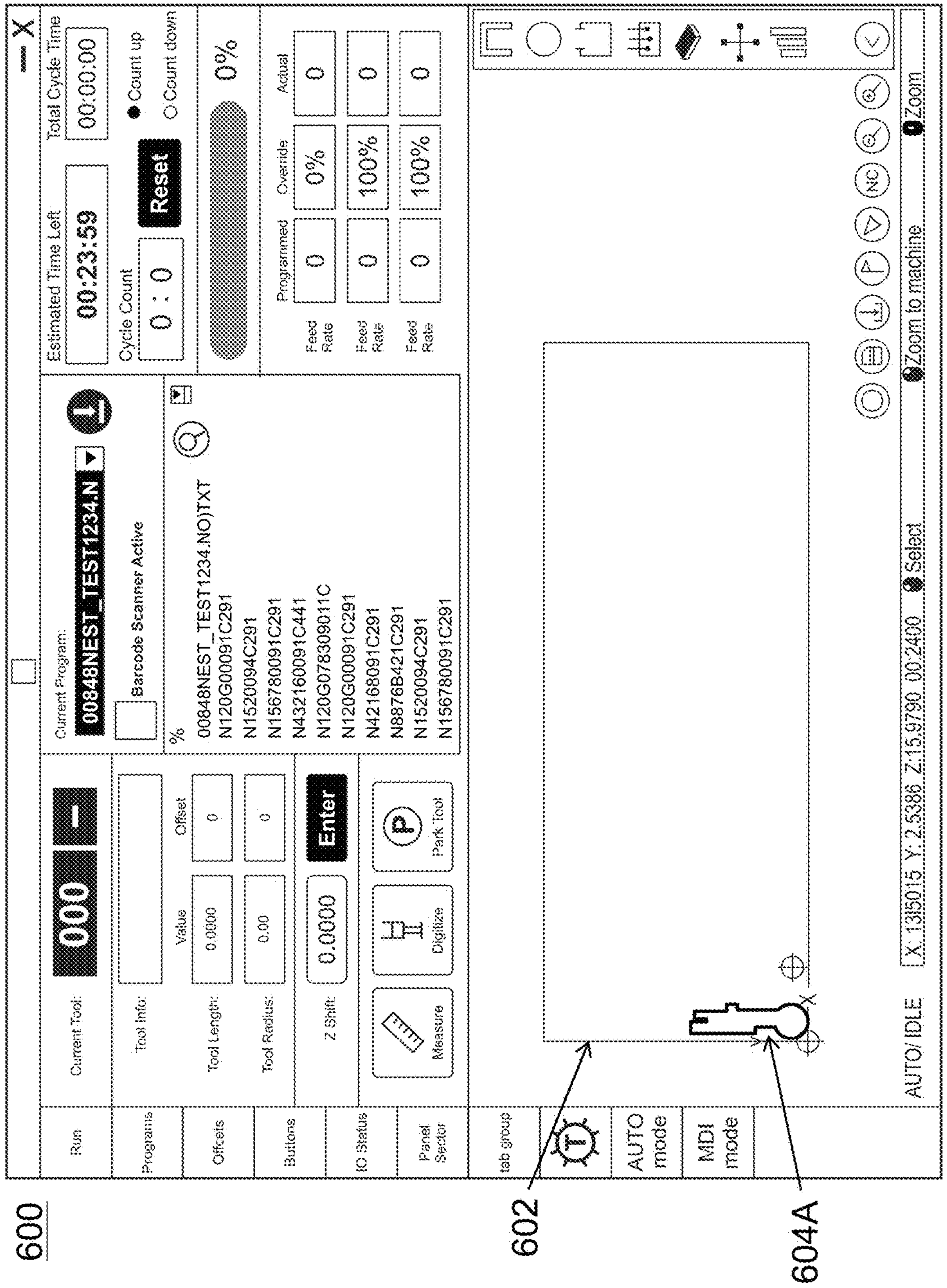
FIG. 6C depicts the example user interface of FIG. 6B for dropping or otherwise positioning the part at a desired location within the bounded region, according to an embodiment of the present invention.

FIGS. 6A-6E depict example user interfaces 600 for selecting and positioning a part 604A (i.e., a component, a piece, a widget, an element, a unit, a module, an item, a section, a portion, etc.) that would be cut from a new block of material as defined by a bounded region 602, according to an embodiment of the present invention. In FIG. 6A, a user may select a current program (e.g., current program 508 of FIGS. 5A and 5B) and access a list of stored files for any number of parts. As shown by FIG. 6B, a digital representation of the part 604A that was selected, during the selection process shown by FIG. 6A, is graphically depicted in proportions to the actual part that would be cut, and the digital representation of the part 604A is configurable such that it can be dragged and dropped to different locations on the user interface 600 within the bounded region 602 that represents a new block of material. As shown by FIG. 6C, the part 604A may be dropped or positioned at a desired location within the bounded region 602 that represents the block of material in a way that would maximize the amount of parts that may be placed within the bounded region in order to best utilize the material. Alternatively, if only a portion of the block of material will be used, it would be advantageous to position the part 604A near the edge in order to keep the remainder of the material for a future project.

Figure 6D:
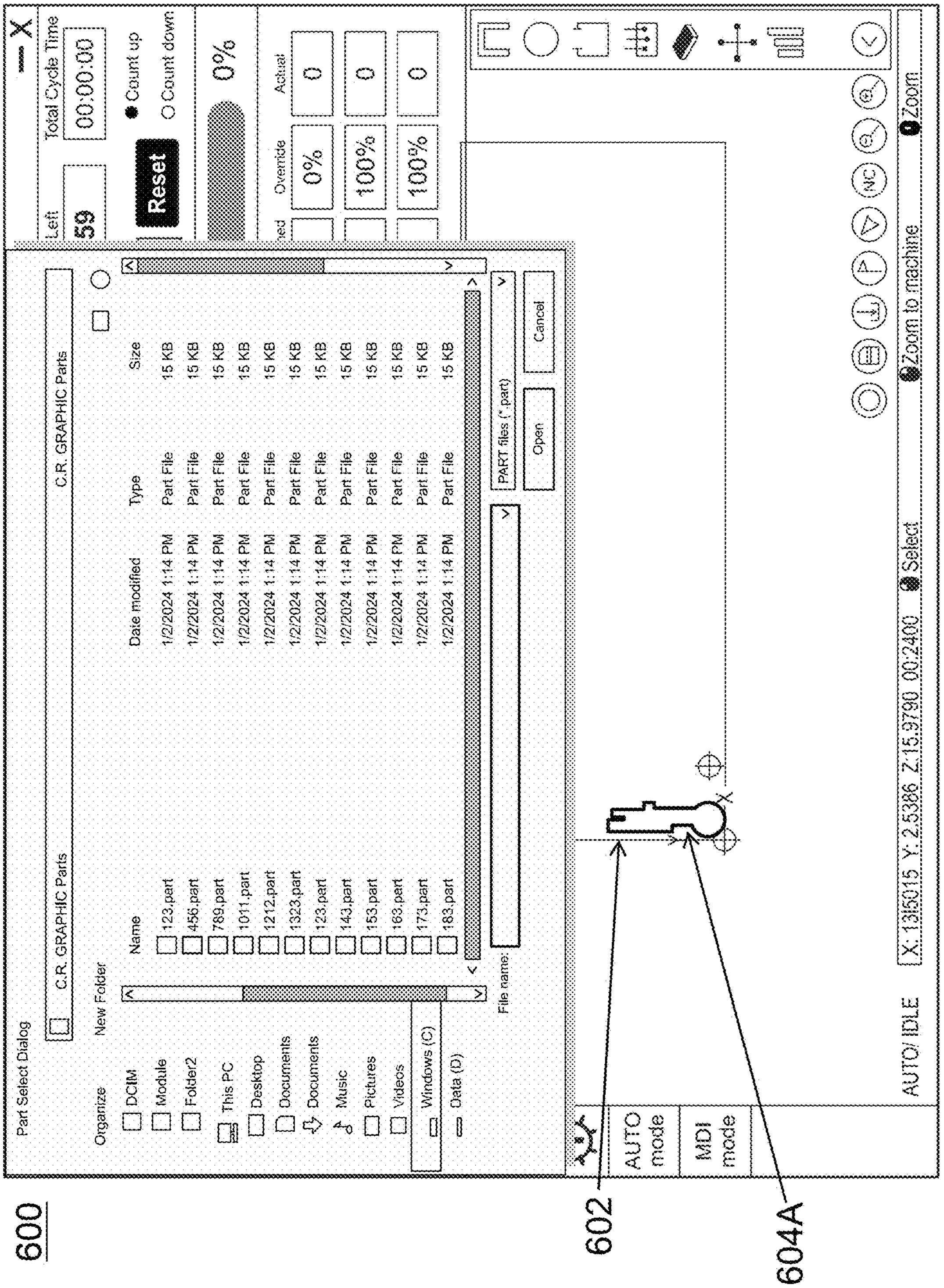
FIG. 6D depicts an example user interface for selecting a second part that would be cut from the new block of material, according to an embodiment of the present invention.
Figure 6E:
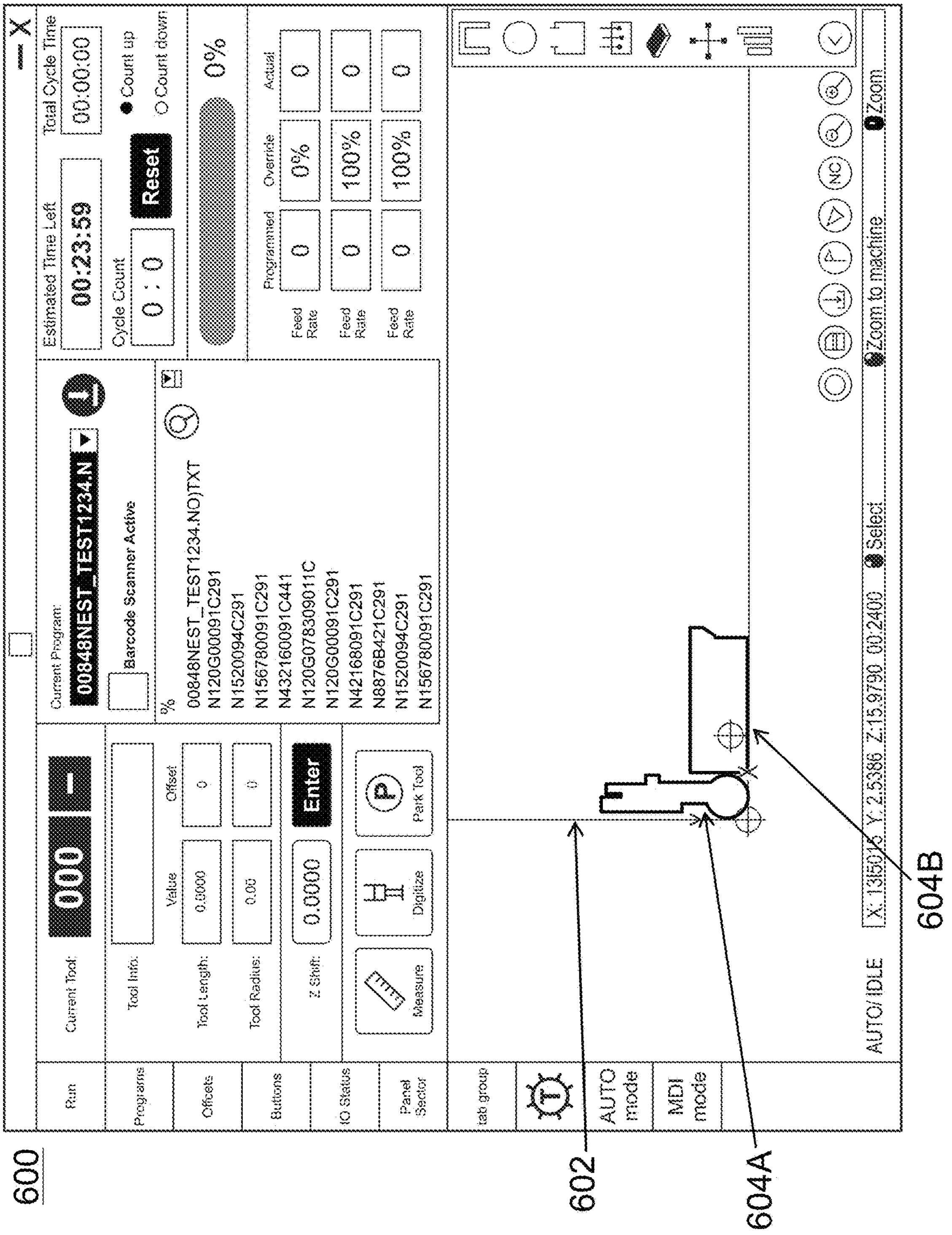
FIG. 6E depicts an example user interface for positioning the second part selected in FIG. 6D within the bounded region of FIG. 6C, according to an embodiment of the present invention.
Figure 6F:
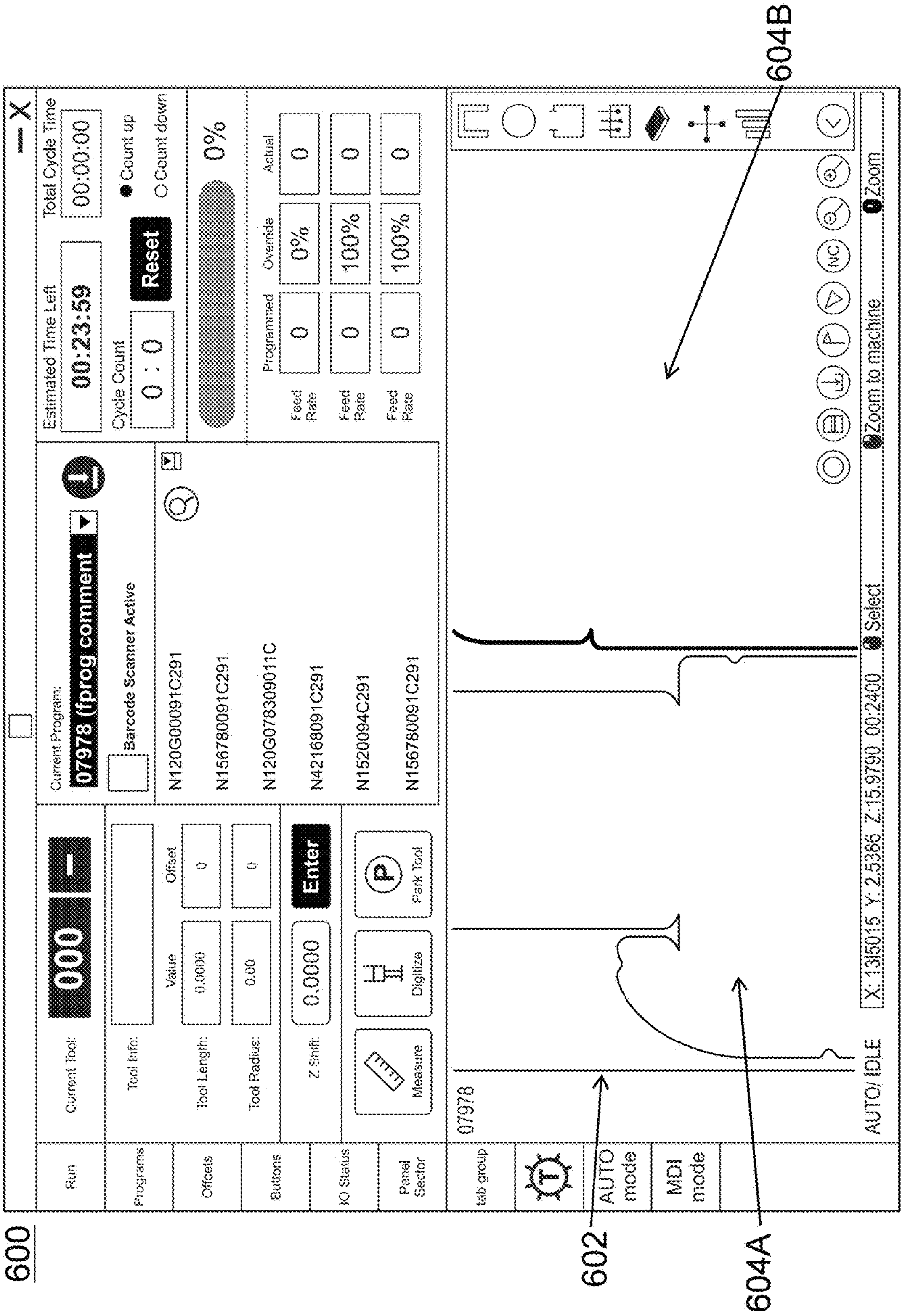
FIG. 6F depicts a magnified view of the user interface of FIG. 6E depicting positioning of the second part relative the first part, according to an embodiment of the present invention.

Further, as depicted by FIG. 6D, the user may select a second part from a list of files of stored parts. Once selected, the second part 604B may be depicted on the screen and the user can drag and drop the second part 604B, as depicted by FIG. 6E, to a desired position within the bounded region 602 that represents the block of material. Further, FIG. 6F is a magnified view of the two parts 604A, 604B of FIG. 6E, which depicts a visualization of the offset positions between parts 604A and 604B. As indicated previously, the outline of the "parts" 604A, 604B are actually the toolpath of the tool used by the cutting program, and an offset may be defined by the G-code so that when a user drags and drops the parts 604A, 604B the parts are restricted such that they cannot overlap and the offset required by the specific tool being used will be automatically calculated to ensure that even if the user drags and drops the second part near the first part, the the first part 604A and the second part 604B are sufficiently spaced apart. Thus, when the spindle or tool used to cut the first part 604A moves along the toothpath outline of the first part 604A, the material will be shaved off but the cut will not damage the adjoining second part 604B due to the offset. This is because the code is designed such that there is built-in spacing between the first part 604A and the second part 604B to ensure any cuts to the first part 604A would not affect the material needed to cut the second part 604B. This functionality of offsetting the parts 604A, 604B can also provide an advantage if clamps or fixtures would need to be visualized by the user interface in order to position the material of the workpiece. Thus, for machines with clamps or fixtures they can also be visualized in their correct position relative to the workpiece and machine zero.

Figure 7A:
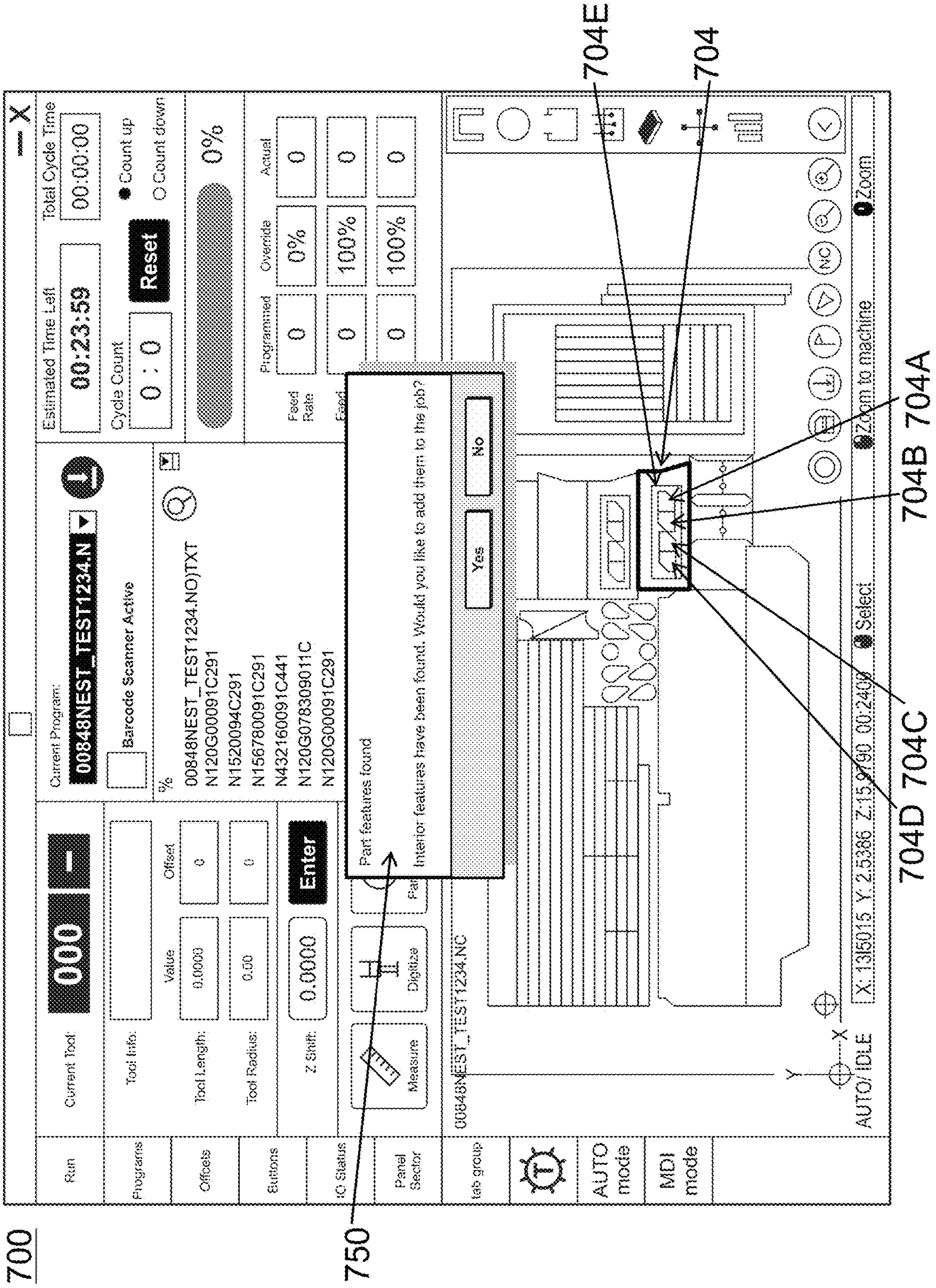
FIG. 7A depicts an example user interface for selecting a part so that the G-code data can be saved, where the part depicts pixels representing interior features, according to an embodiment of the present invention.
Figure 7B:
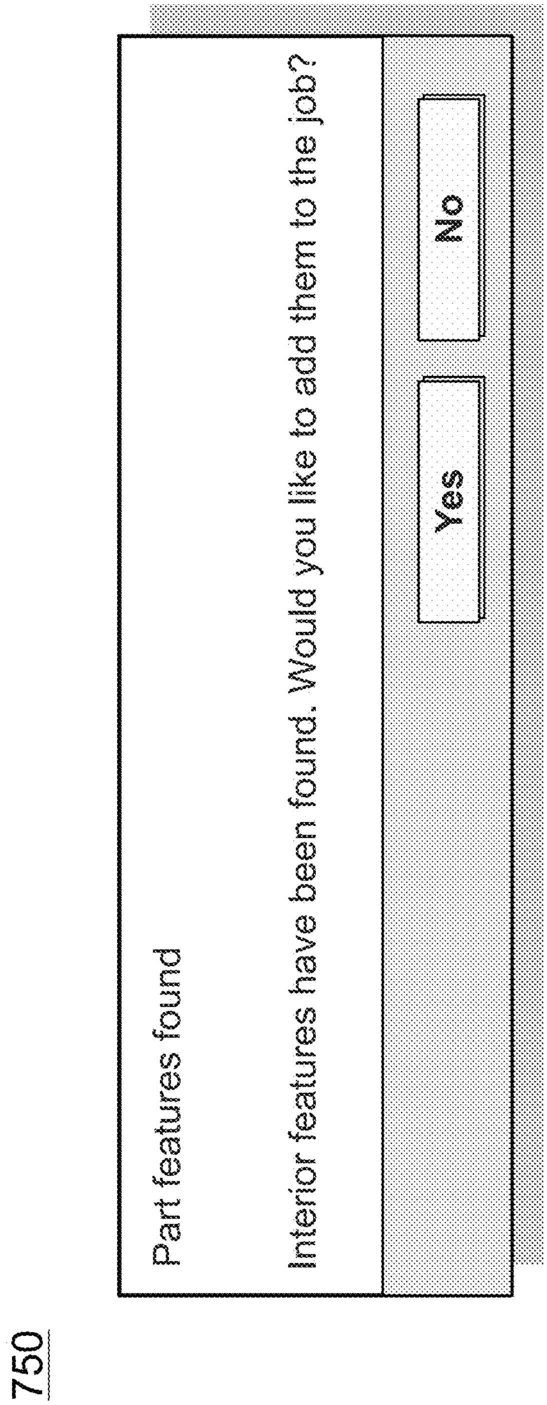
FIG. 7B depicts an example overlay over the user interface of FIG. 7A based on identifying that the part selected depicts interior pixels, according to an embodiment of the present invention.

FIGS. 7A-7B depicts an example user interface 700 for selecting a part 704 so that the G-code data can be saved, where the part 704 depicts pixels representing interior features representing smaller parts 704A, 704B, 704C, 704D, according to an embodiment of the present invention. Within part 704 is a void 704E that would need to be cut into the part 704. In order to maximize material, smaller parts 704A, 704B, 704C, 704D can be positioned within the void 704E. The cutting program recognizes the smaller parts 704A, 704B, 704C, 704D within the bigger part 704 by identifying pixels that represent the interior features or smaller parts 704A, 704B, 704C, 704D. In some embodiments, the interior features may be more than just smaller parts, and may be the void 704E itself (e.g., when the void would be too small for smaller parts to be positioned within the void 704E). When a user selects a part 704 to be saved, and pixels are detected within the part 704, the cutting program may generate a dialog box 750 to let the user know that interior features have been found and to ask the user whether those interior features should be added to the G-code for the part 704, as depicted by FIG. 7B.

Figure 8:
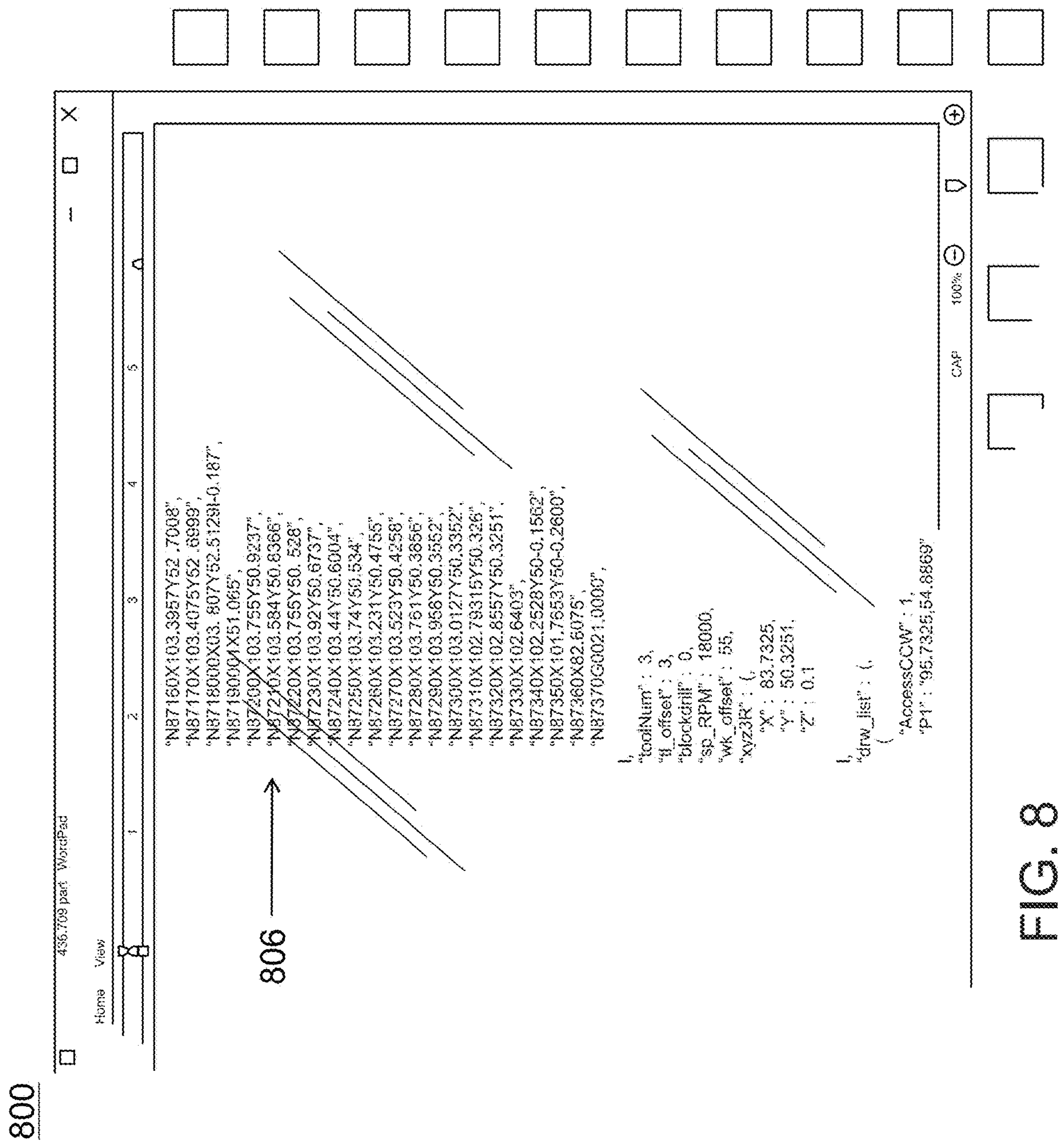
FIG. 8 depicts an example user interface depicting G-code data for a cycle that would be used in cutting a part from a block of material, according to an embodiment of the present invention.

FIG. 8 depicts an example user interface depicting G-code data 806 for a cutting process/cycle that would be used in cutting one or more parts from a block of material, according to an embodiment of the present invention. The G-code data 806 can indicate the tool number that would be needed to cut the part(s), the tool offset, the rotations per minute, the work offset, the x- and y-coordinates for where the part(s) would be positioned within the block of material, etc. As more parts are added to the custom cutting process/cycle, the G-code data 806 for each part is added and formatted within the total G-code for the cutting process/cycle so that the G-code for system would not need to be reprogrammed and code regenerated each time a user wants to customize a cutting process/cycle.

Figure 9:
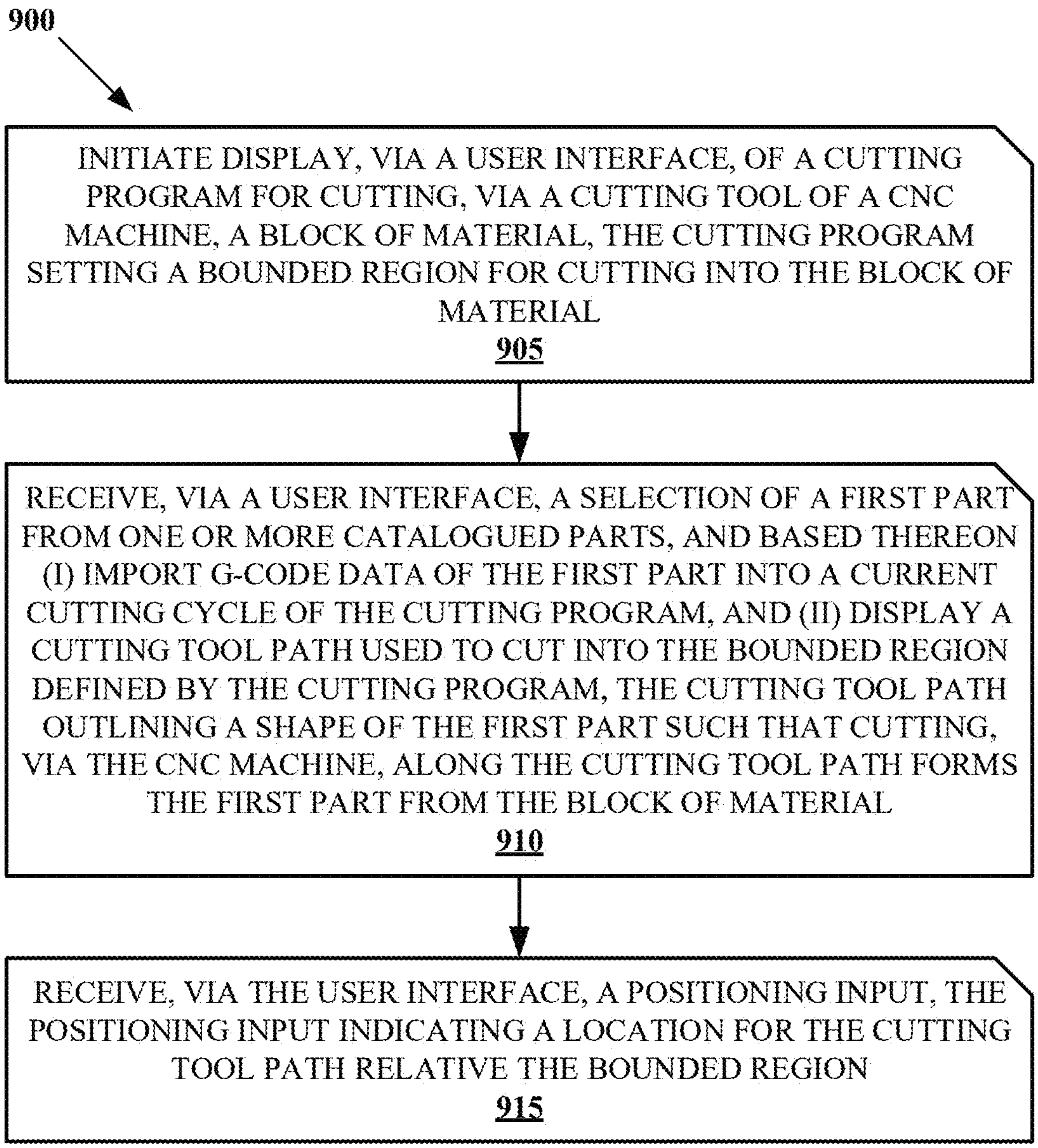
FIG. 9 is a block diagram of an example computer-implemented method, in accordance with an embodiment of the present invention.

FIG. 9 is a block diagram of an example method 900 for, in accordance with an embodiment of the present invention. At block 905, the system initiates display of a cutting program for cutting, via the CNC machine, a block of material, the cutting program setting a bounded region for cutting, via the cutting tool, into the block of material. In some embodiments, the bounded region comprises a maximum area of movement of the spindle of the CNC machine.

At block 910, the system receives, via a user interface, a selection of a first part from one or more catalogued parts, and based thereon (i) imports G-code data of the first part into a current cutting cycle of the cutting program, and (ii) displays a first cutting tool path used to cut into the bounded region defined by the cutting program, the first cutting tool path outlining a shape of the first part such that cutting, via the cutting tool, along the first cutting tool path forms the first part from the block of material. In some embodiments, the first cutting tool path aligns to a center of the cutting tool. In some embodiments, the cutting program of the current cutting cycle indicates at least one selected from the group consisting of a tool number of the cutting tool, a tool offset of the cutting tool, an indication of whether the current cutting cycle uses a blockdrill, a commanded rotations per minute, a work offset being used, and a start point for cutting as depicted, for example, by FIG. 8. In some embodiments, the G-code data of the first part includes a json file in JavaScript that indicates: part information, tool information, header information, offset information, and footer information.

At block 915, the system receives, via the user interface, a positioning input, the positioning input indicating a location for the first cutting tool path relative the bounded region. In some embodiments, the positioning input that is received is based on a drag and drop input provided via the user interface, the drag and drop input moving a depiction of the first cutting tool path to a position within a depiction of the bounded region.

In some embodiments, the method 900 further includes receiving, via the user interface of a computing device, one or more inputs indicating one or more components of the one or more products that are to be catalogued or filed as the one or more catalogued parts, the one or more components including the first part. Thus, the user may indicate that the G-code data of the first part is to be saved. Further, the method 900 may include storing, to one or more storage locations, corresponding G-code data of each of the one or more components. Further, the method 900 includes detecting presence of one or more pixels internal to a component of the one or more components. Based thereon, the cutting program initiates display of a prompt inquiring whether the one or more interior features represented by the detected one or more pixels is to be included in the corresponding G-code data of the component of the one or more components. In addition, based on receiving a response to the prompt that the one or more interior features are not to be included in the corresponding G-code data of the component, the cutting program imports G-code data of the component absent a portion of the corresponding G-code data corresponding to the one or more interior features into G-code of the current cutting cycle. Alternatively, based on the user indicating that the interior features are to be included in the corresponding G-code data, the G-code data for the part would include the one or more interior features. As indicated previously, the interior features can indicate a void, abscess, channel, internal parts positioned within a void, etc.

In some embodiments, the cutting tool path outlines and is slightly larger than the actual desired size of the part itself so that when the tool or spindle shaves off material then based on the size of the tool the actual part is slightly smaller than the resulting cutting toolpath. Accordingly, in some embodiments, the cutting tool path is larger than a size of the first part such that cutting along the cutting tool path removes material corresponding to a width of the cutting tool such that the shape of the first part is formed by removing the material. In some embodiments, the positioning input includes a predefined buffer region, based on an indication provided to the cutting program, of the width of the cutting tool between the first cutting tool path of the first part and a second cutting tool path used to cut into the bounded region defined by the cutting program to form a second part from the block of material. Thus, not only is the toolpath offset from the actual part size but the parts themselves may be offset one from another.

In some embodiments, the method 900 also includes writing a file of a complete cutting path for the current cycle of the cutting program, the file including the G-code data of the first part as well as corresponding G-code data for any additional parts. In some embodiments, the file of the complete cutting path comprises header information for the first part as well as for each additional part.

Computer program instructions are configured to carry out operations of the present invention and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to explain the principles of one or more aspects of the invention and the practical application thereof, and to enable others of ordinary skill in the art to understand one or more aspects of the invention for various embodiments with various modifications as are suited to the particular use contemplated.

It is to be noted that various terms used herein such as "Linux®," "Windows®," "macOS®," "iOS®," "Android®," and the like may be subject to trademark rights in various jurisdictions throughout the world and are used here only in reference to the products or services properly denominated by the marks to the extent that such trademark rights may exist.

What is claimed is:

1. A data processing manufacturing control system, the data processing manufacturing control system comprising:

a CNC machine facilitating manufacture of one or more products;

a cutting tool operatively coupled to a spindle of the CNC machine;

at least one processor;

a communication interface communicatively coupled to the at least one processor and the spindle; and a memory device storing executable code that, when executed, causes the at least one processor to:

initiate display of a cutting program for cutting, via the CNC machine, a block of material, the cutting program setting a bounded region for cutting, via the cutting tool, into the block of material;

receive, via a user interface, a selection of a first part from one or more catalogued parts, and based thereon (i) import G-code data of the first part into a current cutting cycle of the cutting program, and (ii) display a first cutting tool path used to cut into the bounded region defined by the cutting program, the first cutting tool path outlining a shape of the first part such that cutting, via the cutting tool, along the first cutting tool path forms the first part from the block of material;

receive, via the user interface, a positioning input, the positioning input indicating a location for the first cutting tool path relative the bounded region; and initiate, via the cutting program and based on the positioning input, execution of a cut, via the cutting tool, into the block of material at the location for the first cutting tool path.

2. The data processing manufacturing control system of claim 1, wherein the executable code, when executed, further causes the at least one processor to:

receive, via the user interface of a computing device, one or more inputs indicating one or more components of the one or more products that are to be catalogued as the one or more catalogued parts, the one or more components including the first part; and store, to one or more storage locations, corresponding G-code data of each of the one or more components.

3. The data processing manufacturing control system of claim 2, wherein the executable code, when executed, further causes the at least one processor to:

detect presence of one or more pixels internal to a component of the one or more components;

initiate display of a prompt inquiring whether the one or more interior features represented by the detected one or more pixels is to be included in the corresponding G-code data of the component of the one or more components.

4. The data processing manufacturing control system of claim 3, wherein, based on receiving a response to the prompt that the one or more interior features are not to be included in the corresponding G-code data of the component, importing G-code data of the component absent a portion of the corresponding G-code data corresponding to the one or more interior features into G-code of the current cutting cycle.

5. The data processing manufacturing control system of claim 1, wherein the cutting tool path is larger than a size of the first part such that cutting along the cutting tool path removes material corresponding to a width of the cutting tool such that the shape of the first part is formed by removing the material.

6. The data processing manufacturing control system of claim 5, wherein the positioning input includes a predefined buffer region, based on an indication provided to the cutting program, of the width of the cutting tool between the first cutting tool path of the first part and a second cutting tool path used to cut into the bounded region defined by the cutting program to form a second part from the block of material.

7. The data processing manufacturing control system of claim 1, wherein the positioning input received is based on a drag and drop input provided via the user interface, the drag and drop input moving a depiction of the first cutting tool path to a position within a depiction of the bounded region.

8. The data processing manufacturing control system of claim 1, wherein the bounded region comprises a maximum area of movement of the spindle of the CNC machine.

9. The data processing manufacturing control system of claim 1, wherein the executable code, when executed, further causes the at least one processor to write a file of a complete cutting path for the current cycle of the cutting program, the file including the G-code data of the first part as well as corresponding G-code data for any additional parts.

10. The data processing manufacturing control system of claim 9, wherein the file of the complete cutting path comprises header information for the first part as well as for each additional part.

11. The data processing manufacturing control system of claim 1, wherein the first cutting tool path aligns to a center of the cutting tool.

12. The data processing manufacturing control system of claim 1, wherein the cutting program of the current cutting cycle indicates at least one selected from the group consisting of a tool number of the cutting tool, a tool offset of the cutting tool, an indication of whether the current cutting cycle uses a blockdrill, a commanded rotations per minute, a work offset being used, and a start point for cutting.

13. The data processing manufacturing control system of claim 1, wherein the G-code data of the first part includes a json file in JavaScript that indicates: part information, tool information, header information, offset information, and footer information.

14. A computer-implemented method, comprising:

initiating display, via a user interface, of a cutting program for cutting, via a cutting tool of a CNC machine, a block of material, the cutting program setting a bounded region for cutting into the block of material;

receiving, via a user interface, a selection of a first part from one or more catalogued parts, and based thereon (i) importing G-code data of the first part into a current cutting cycle of the cutting program, and (ii) displaying a cutting tool path used to cut into the bounded region defined by the cutting program, the cutting tool path outlining a shape of the first part such that cutting, via the CNC machine, along the cutting tool path forms the first part from the block of material;

receiving, via the user interface, a positioning input, the positioning input indicating a location for the cutting tool path relative the bounded region;

initiating, via the cutting program and based on the positioning input, execution of a cut, via the cutting tool, into the block of material at the location for the cutting tool path.

15. The computer-implemented method of claim 14, further comprising:

receiving, via the user interface of a computing device, one or more inputs indicating one or more components of the one or more products that are to be catalogued as the one or more catalogued parts, the one or more components including the first part; and storing, to one or more storage locations, corresponding G-code data of each of the one or more components.

16. The computer-implemented method of claim 15, further comprising:

detecting presence of one or more pixels internal to a component of the one or more components;

initiating display of a prompt inquiring whether the one or more interior features represented by the detected one or more pixels is to be included in the corresponding G-code data of the component of the one or more components.

17. A computing system, comprising:

at least one processor;

a communication interface communicatively coupled to the at least one processor, and a memory device storing executable code that, when executed, causes the at least one processor to:

initiate display, via a user interface, of a cutting program for cutting, via a cutting tool of a CNC machine, a block of material, the cutting program setting a bounded region for cutting into the block of material;

receive, via a user interface, a selection of a first part from one or more catalogued parts, and based thereon (i) import G-code data of the first part into a current cutting cycle of the cutting program, and (ii) display a cutting tool path used to cut into the bounded region defined by the cutting program, the cutting tool path outlining a shape of the first part such that cutting, via the CNC machine, along the cutting tool path forms the first part from the block of material;

receive, via the user interface, a positioning input, the positioning input indicating a location for the cutting tool path relative the bounded region;

initiate, via the cutting program and based on the positioning input, execution of a cut, via the cutting tool, into the block of material at the location for the cutting tool path.

18. The production machine system of claim 17, wherein the executable code, when executed, further causes the at least one processor to:

receive, via the user interface of a computing device, one or more inputs indicating one or more components of the one or more products that are to be catalogued as the one or more catalogued parts, the one or more components including the first part; and store, to one or more storage locations, corresponding G-code data of each of the one or more components.

19. The production machine system of claim 18, wherein the executable code, when executed, further causes the at least one processor to:

detect presence of one or more pixels internal to a component of the one or more components;

initiate display of a prompt inquiring whether the one or more interior features represented by the detected one or more pixels is to be included in the corresponding G-code data of the component of the one or more components.

20. The production machine system of claim 17, wherein the cutting tool path is larger than a size of the first part such that cutting along the cutting tool path removes material corresponding to a width of the cutting tool such that the shape of the first part is formed by removing the material.

* * * * *